(12) United States Patent
Ellington

(10) Patent No.: US 7,988,405 B2
(45) Date of Patent: Aug. 2, 2011

(54) PALLET JACK SYSTEM AND METHOD FOR THE TRANSPORTATION OF STACKABLE PACKAGED GOODS PALLETS

(75) Inventor: Stanley Charles Ellington, Trussville, AL (US)

(73) Assignee: Coca-Cola Bottling Co. United

( * ) Notice: Subject to any disclaimer, the term of this patent is extended or adjusted under 35 U.S.C. 154(b) by 72 days.

(21) Appl. No.: 12/017,652

(22) Filed: Jan. 22, 2008

(65) Prior Publication Data
US 2009/0185890 A1     Jul. 23, 2009

(51) Int. Cl.
*B66F 9/12* (2006.01)
(52) U.S. Cl. ............... 414/668; 187/237; 280/43.12
(58) Field of Classification Search .......... 414/458, 414/668; 187/237; 280/43.12
See application file for complete search history.

(56) References Cited

U.S. PATENT DOCUMENTS

| | | | |
|---|---|---|---|
| 2,628,734 A | 2/1953 | Jannsen | |
| 2,675,139 A | 4/1954 | Mercier et al. | |
| 2,761,579 A | 9/1956 | Bickerstaff | |
| 3,387,731 A | 6/1968 | Gibson et al. | |
| 3,392,858 A | 7/1968 | Fernstrom et al. | |
| 3,495,730 A | 2/1970 | Rigsby | |
| 3,870,356 A * | 3/1975 | Meads | 294/81.5 |
| 4,239,446 A | 12/1980 | Vucinic | |
| 4,355,947 A | 10/1982 | Wiblin | |

(Continued)

FOREIGN PATENT DOCUMENTS
GB     2214895 A  *  9/1989

OTHER PUBLICATIONS

Transmittal; International Search Report; and Written Opinion of the International Searching Authority for International Application No. PCT/US2009/031696 mailed on Apr. 6, 2009.

*Primary Examiner* — Gregory W Adams
*Assistant Examiner* — Jonathan D Snelting
(74) *Attorney, Agent, or Firm* — Katten Muchin Rosenman LLP

(57) ABSTRACT

A pallet jack is disclosed that comprises a left tine, center tine, and a right tine. The center tine is about 2 times the width of each of the left and right tines, though other widths of the center tine can also be implemented. Because the center tine is about twice the width of the left and right tines, two pallets, side-by-side, can be carried simultaneously with only three tines. According to another embodiment of the pallet jack, a portion of the center tine (a right-most portion) and the right tine can have raised areas that enable an operator of the pallet jack to lift a right pallet that sits on the raised areas higher than the left pallet. The left pallet sits on the left tine and center tine without the raised areas (at a lower height). Thus, the operator of the pallet jack can place the left pallet in a first location without disengaging the tines from the right pallet, or without lowering the right pallet all the way to the ground (or a first location surface). Alternatively, the raised areas can be located on the left tine and the left-most portion of the center tine, in which case, the operator of the pallet jack can place the right pallet in a first location without disengaging the tines from the left pallet, or without lowering the left pallet all the way to the ground (or a first location surface).

15 Claims, 34 Drawing Sheets

U.S. PATENT DOCUMENTS

| | | |
|---|---|---|
| 4,601,480 A | 7/1986 | Arwidsson et al. |
| 4,669,949 A | 6/1987 | Sutton |
| 4,941,794 A | 7/1990 | Hara et al. |
| 5,139,385 A | 8/1992 | Chase et al. |
| 5,215,427 A * | 6/1993 | Olsthoorn et al. ............ 414/664 |
| 5,237,936 A | 8/1993 | Susel et al. |
| 5,417,541 A | 5/1995 | Herron |
| 5,590,735 A | 1/1997 | Cartier |
| 6,343,674 B1 * | 2/2002 | Sexsmith ....................... 187/222 |
| 6,881,023 B1 * | 4/2005 | Sullivan ........................ 414/607 |
| 7,213,684 B2 | 5/2007 | Burns et al. |
| 2006/0231323 A1 | 10/2006 | Rosenfeld et al. |

* cited by examiner

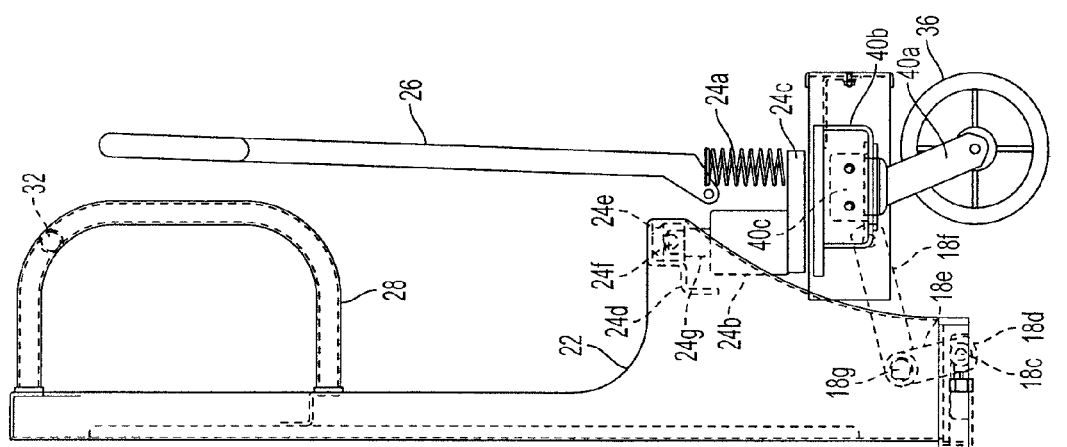
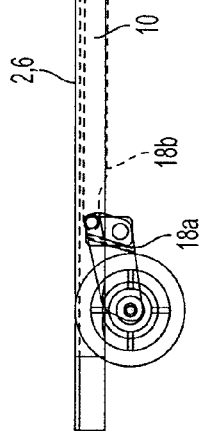
FIG. 4

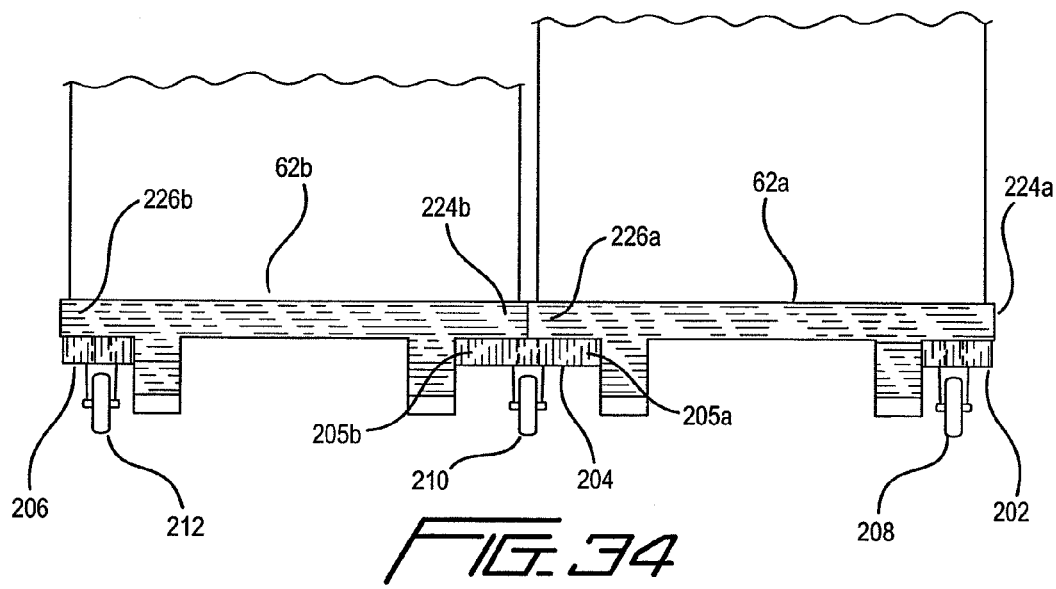
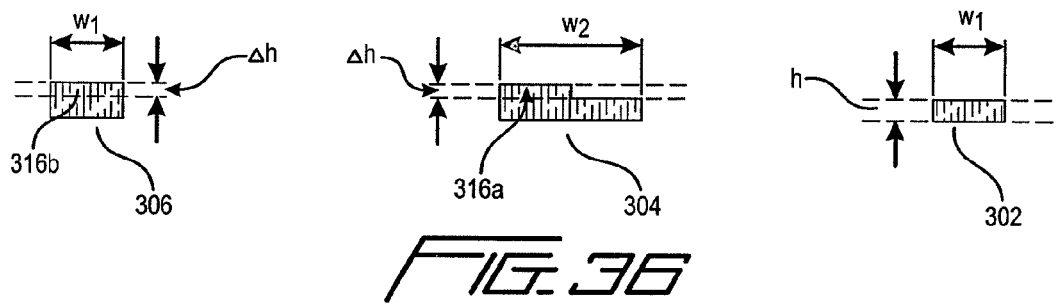
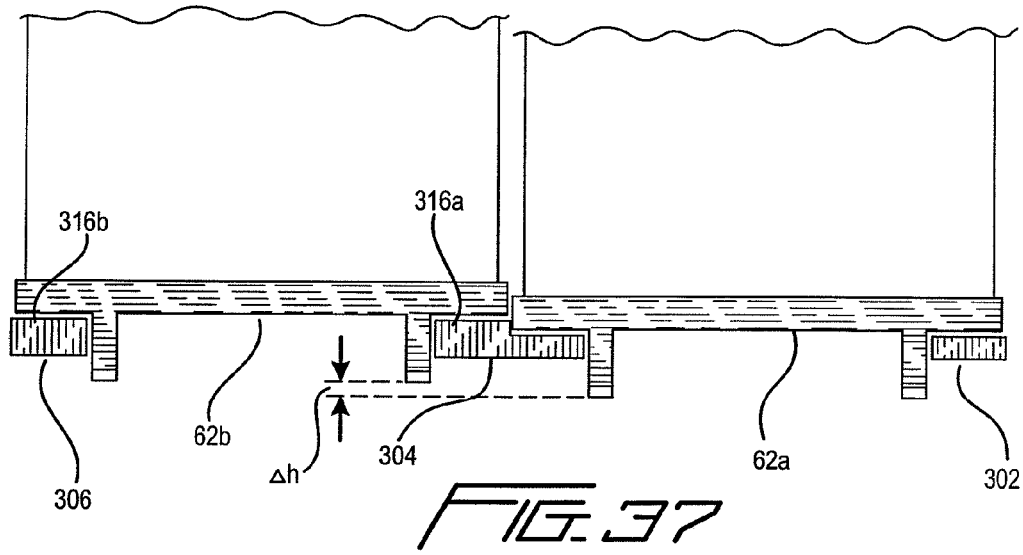

PALLET JACK SYSTEM AND METHOD FOR THE TRANSPORTATION OF STACKABLE PACKAGED GOODS PALLETS

CROSS REFERENCE TO RELATED APPLICATIONS

Related subject matter is disclosed in co-pending U.S. Non-provisional patent application Ser. No. 11/615,635, entitled "Stackable Packaged Goods Pallet", filed on Dec. 22, 2006; in co-pending U.S. Non-provisional patent application Ser. No. 11/615,677, entitled "A Pallet Jack System And Method for the Transportation of Stackable Packaged Goods", filed on Dec. 22, 2006; and in co-pending U.S. Non-provisional patent application Ser. No. 11/890,530, entitled "Stackable Packaged Goods Pallet", filed on Aug. 7, 2007, wherein the entire contents of all aforementioned co-pending applications are expressly incorporated herein by reference.

BACKGROUND OF THE INVENTION

1. Field of the Invention

The invention relates to pallet jacks. More particularly, the invention relates to a system and method for operating and transporting a pallet jack loaded with packaged goods, wherein the packaged goods comprise consumer goods and/or raw materials for manufacturing, and wherein the pallet jack can be transported from a lower non-smooth surface to an upper surface, and further wherein the pallet jack can carry two pallets, side-by-side, and can place a first pallet at a first location separately from a second pallet without lowering the tines to disengage the second pallet.

2. Background Art

Manually operated pallet jacks are mechanical devices used primarily for interior applications in such locations as warehouses and some larger consumer stores. The term "manually" refers to the means for moving and operating the pallets jacks: typically, they use hydraulic, pneumatic or electric lifting mechanisms that an operator enables to lift goods. Pallet jacks typically have two or more tines or forks, that are placed under a pallet, upon which is stored the goods to be moved. In the U.S., loaded pallets are typically about 4 feet long by 4 feet wide, and can be between a couple of inches to as much as 8-10 feet in height. The major considerations in the maximum height are the weight to be lifted and the center of gravity.

Other types of pallet jacks include those that are completely or semi-automated. These pallet jacks can include an internal combustion engine or motor, or an electric or propane operated motor that drives the pallet jack according to mechanical inputs received from the operator. Some of these pallet jacks can place goods on pallet several stories in height (20'-40').

As briefly discussed above, pallet jacks are usually operated in the interior of buildings, on substantially smooth, pre-stressed concrete floors. These floors are extremely smooth and extremely strong. Pallet jacks are generally designed to operate in such an interior environment, and usually have two small wheels located in the rear portion of the pallet jack, directly under the lifting mechanism. The tines, or forks, are located outwardly from the centrally located rear wheels (see FIG. 1 as an example of prior art pallet jack), and the lifting mechanism is located directly over the centrally located rear wheels. Such known pallet jacks are generally useful for lifting heavily loaded pallets, wherein the pallets have a length (measured in the same direction as the tines extend from the pallet jack) to width ratio of about 1.0 and less. That is, the prior art pallet jacks generally are used to lift pallets in which the width is usually the same or greater than the length. That is the most stable lifting configuration for these prior art pallet jacks.

As can be seen in the typical prior art pallet jack, the front and centrally located rear wheels are designed to be used on the substantially smooth surfaces inside warehouses on the pre-stressed concrete floors. Using these types of pallet jacks outside, on the rough terrain of a gravel parking lot would be ineffective at best, and possibly dangerous because of their instability in that type of environment. Furthermore, if the dimensions of the pallet the pallet jack were carrying was such that its width exceeds the width of the tines, and the pallet's length was longer than that of the tines, then again the pallet jack could be dangerous to operate. Further still, using the prior art jack as shown in FIG. 1 inside a retail environment, such as a convenience store, could scuff the polished floors because of the type of wheels that are typically used.

FIG. 2 illustrates a second type of device for carrying goods inside a retail environment. As can be seen, however, these types of devices lack any type of lifting mechanism, the rear wheels that pivot are too small for rough terrain (such as gravel parking lots) and the amount of goods they can lift are limited by structural limitations of the device. Furthermore, to use such a device shown in FIG. 2, a user will have to load each item and then unload each item. This type of repetitious activity can lead to repetitive motion injuries, accidents and thus increases costs for the manufacturer/distributor of the goods/products delivered by the device.

Thus, a need exists for a pallet jack that can operate on both non-smooth exterior and smooth interior surfaces with substantial ease, and that can also carry a significant amount of goods using differently shaped pallets, wherein the length to width ratios are about 2:1, 3:1 or even more.

SUMMARY OF THE INVENTION

It is therefore a general object of the invention to provide a pallet jack that will obviate or minimize problems of the type previously described.

It is a specific object of the invention to provide a pallet jack that can be used in substantially rough or non-smooth terrain.

It is a related object of the invention to provide a pallet jack that can be used in both an exterior and interior environment without scuffing or otherwise marring interior floors.

It is another object of the invention to provide a pallet jack that can be loaded with a significant amount of goods and that can be operated in a substantially rough or non-smooth exterior environment with stability and ease for the operator.

It is a further object of the invention to provide a pallet jack wherein the left and right rear wheels are each substantially aligned along centerlines of a left and right tine, can rotate independently of each other, in both a substantially vertical and a substantially horizontal plane, and thereby provider substantially greater stability over rough terrain.

It is a further object of the present invention to provide a pallet jack wherein the left and right rear wheels are substantially aligned at outer edges of a body of the pallet jacks, thereby provider substantially greater stability over rough terrain.

It is a further object of the invention to provide a pallet jack wherein the left and right rear wheels and left and right front wheels are substantially aligned at outer edges of a body of the pallet jack, and thereby provide substantially greater stability over rough terrain.

It is a further object of the invention to provide a pallet jack wherein the left and right rear wheels and left and right front wheels have an aspect ratio that provides substantially greater stability over rough terrain.

It is a further object of the invention to provide a pallet jack with semi-circular handles located at an uppermost position of the pallet jack, thereby provider substantially greater stability over rough terrain.

The above described disadvantages are overcome and a number of advantages are realized by the present invention which relates to a pallet jack, comprising: a left tine and a right tine, of substantially similar length, wherein the left and right tines are substantially planar and substantially parallel to each other; a lifting mechanism configured to lift the left and right tines; a pallet jack body attached to a rear-most portion of each of the left and right tines, the pallet jack body including a substantially vertical backing portion attached to the rear-most portion of each of the left and right tines, and a substantially horizontal portion attached to a lowermost portion of the substantially vertical backing portion, and wherein the lifting mechanism is attached to the substantially horizontal portion of the pallet jack body along a centerline of the pallet jack; a left front wheel located and rotationally attached to a front-most portion of the left tine; a right front wheel located and rotationally attached to a front-most portion of the right tine; a left rear wheel located along a centerline of the left tine; and a right rear wheel located along a centerline of the right tine, wherein each of the left and right rear wheels is configured to independently rotate in a substantially vertical plane about its respective center, and further wherein, each of the left and right rear wheels is configured to independently rotate in a substantially horizontal plane.

According to the first aspect of the present invention the pallet jack is configured to transport a pallet, and wherein the pallet is configured to be loaded with packaged goods, and further wherein the pallet is further configured to be loaded with one or more trays, and wherein each of the one or more trays is configured to hold one or more beverage bottles.

According to the first aspect of the present invention the pallet jack further comprises: a substantially horizontal plate, wherein the substantially horizontal portion of the pallet jack body, the lifting mechanism, and the left and right rear wheels are fixedly connected to the substantially horizontal plate.

The first aspect of the present invention further comprising: a rear guard portion located along substantially all of an outermost portion of the substantially horizontal plate, wherein, the rear guard portion is configured to protect the pallet jack from contact with other objects, and the rear guard portion is further configured to protect other objects from contact with the pallet jack.

According to the first aspect of the present invention the lifting mechanism operates pneumatically, the lifting mechanism operates electrically, or the lifting mechanism operates hydraulically.

The first aspect of the present invention further comprising: a left guard portion located on an outermost portion of the left tine; and a right guard portion located on an outermost portion of the right tine, wherein the left and right guard portion are each configured to protect the pallet jack from contact with other objects, and the left and right guard portion are each further configured to protect other objects from contact with the pallet jack.

The first aspect of the present invention further comprising: a strap attached to the substantially vertical portion, wherein the strap is configured to substantially securely retain a pallet placed on the left and right tines, and wherein the pallet is configured to contain one or more beverage trays, and wherein each of the one or more trays is configured to retain one or more beverage bottles.

According to the first aspect of the present invention the strap comprises: a retractable strap configured to retract into a strap container such that the retractable strap is substantially prevented from inadvertently coming into contact with other objects, and wherein each of the left and right the rear wheels comprises: a locking wheel that can be manually locked to substantially prevent inadvertent rolling of the pallet jack.

A second aspect of the present invention provides a pallet jack, comprising: a left tine and a right tine, of substantially similar length, wherein the left and right tines are substantially planar and substantially parallel to each other; a lifting mechanism configured to lift the left and right tines; a pallet jack body attached to a rear-most portion of each of the left and right tines, the pallet jack body including a substantially vertical backing portion attached to the rear-most portion of each of the left and right tines, and a substantially horizontal portion attached to a lowermost portion of the substantially vertical backing portion, and wherein the lifting mechanism is attached to the substantially horizontal portion of the pallet jack body along a centerline of the pallet jack; a left front wheel located and rotationally attached to a front-most portion of the left tine; a right front wheel located and rotationally attached to a front-most portion of the right tine; a left rear wheel located at a first distance from a centerline of the pallet jack; and a right rear wheel located at a second distance from the centerline of the pallet jack, wherein the first distance is substantially the same as the second distance, such that the right rear wheel and the left rear wheel are located at substantially equidistant points from the centerline of the pallet jack, and further wherein, the left rear wheel is located at an outermost portion on the left side of the pallet jack, and the right rear wheel is located at an outermost portion on the right side of the pallet jack, and further wherein the respective locations of the left and right rear wheels enable the pallet jack to have improved stability when lifting a pallet that has a length to width ratio of greater than about 2.0.

According to the second aspect of the present invention the pallet jack is configured to transport a pallet, and wherein the pallet is configured to be loaded with packaged goods, and further wherein the pallet is further configured to be loaded with one or more trays, and wherein each of the one or more trays is configured to hold one or more beverage bottles.

According to the second aspect of the present invention the pallet jack further comprises: a substantially horizontal plate, wherein the substantially horizontal portion of the pallet jack body, the lifting mechanism, and the left and right rear wheels are fixedly connected to the substantially horizontal plate.

The second aspect of the present invention further comprising: a rear guard portion located along substantially all of an outermost portion of the substantially horizontal plate, wherein, the rear guard portion is configured to protect the pallet jack from contact with other objects, and the rear guard portion is further configured to protect other objects from contact with the pallet jack.

According to the second aspect of the present invention the lifting mechanism operates pneumatically, the lifting mechanism operates electrically or the lifting mechanism operates hydraulically.

The second aspect of the present invention further comprising: a left guard portion located on an outermost portion of the left tine; and a right guard portion located on an outermost portion of the right tine, wherein the left and right guard portion are each configured to protect the pallet jack from contact with other objects, and the left and right guard portion are each further configured to protect other objects from contact with the pallet jack.

The second aspect of the present invention further comprising: a strap attached to the substantially vertical portion, wherein the strap is configured to substantially securely retain a pallet placed on the left and right tines, and wherein the pallet is configured to contain one or more beverage trays, and wherein each of the one or more trays is configured to retain one or more beverage bottles.

According to the second aspect of the present invention the strap comprises: a retractable strap configured to retract into a strap container such that the retractable strap is substantially prevented from inadvertently coming into contact with other objects, and wherein each of the left and right the rear wheels comprises: a locking wheel that can be manually locked to substantially prevent inadvertent rolling of the pallet jack.

A third aspect of the present invention provides a pallet jack having front and rear wheels that are located at the outermost portions of the pallet jack body, and wherein such a configuration maximizes the ability of the pallet jack to navigate rough terrain.

Accordingly, a third aspect of the present invention provides a pallet jack comprising: a left tine and a right tine, of substantially similar length, wherein the left and right tines are substantially planar and substantially parallel to each other; a lifting mechanism configured to lift the left and right tines; a pallet jack body attached to a rear-most portion of each of the left and right tines, the pallet jack body including a substantially vertical backing portion attached to the rear-most portion of each of the left and right tines, and a substantially horizontal portion attached to a lowermost portion of the substantially vertical backing portion, and wherein the lifting mechanism is attached to the substantially horizontal portion of the pallet jack body along a centerline of the pallet jack; a left front wheel located and rotationally attached to a front-most portion of the left tine; a right front wheel located and rotationally attached to a front-most portion of the right tine; and a left rear wheel located at a first distance from a centerline of the pallet jack; and a right rear wheel located at a second distance from the centerline of the pallet jack, wherein the first distance is substantially the same as the second distance, such that the right rear wheel and the left rear wheel are located at substantially equidistant points from the centerline of the pallet jack, and further wherein, the left rear wheel is located at an outermost portion on the left side of the pallet jack, and the right rear wheel is located at an outermost portion on the right side of the pallet jack, and further wherein the respective positions of the left and right rear wheels enable the pallet jack to have an improved ability to navigate substantially non-smooth exterior surfaces and/or surfaces that include gravel, holes, cracks and/or differences in height.

According to the third aspect of the present invention the pallet jack is configured to transport a pallet, and wherein the pallet is configured to be loaded with packaged goods, and further wherein the pallet is further configured to be loaded with at least one tray, and wherein each of the one or more trays is configured to hold at least one beverage bottle.

According to the third aspect of the present invention the pallet jack further comprises: a substantially horizontal plate, wherein the substantially horizontal portion of the pallet jack body, the lifting mechanism, and the left and right rear wheels are fixedly connected to the substantially horizontal plate, and the pallet jack further comprises a rear guard portion located along substantially all of an outermost portion of the substantially horizontal plate, wherein, the rear guard portion is configured to protect the pallet jack from contact with other objects, and the rear guard portion is further configured to protect other objects from contact with the pallet jack.

According to the third aspect of the present invention the lifting mechanism operates pneumatically, the lifting mechanism operates electrically, or the lifting mechanism operates hydraulically.

The third aspect of the present invention further comprising: a left guard portion located on an outermost portion of the left tine; and a right guard portion located on an outermost portion of the right tine, wherein the left and right guard portion are each configured to protect the pallet jack from contact with other objects, and the left and right guard portion are each further configured to protect other objects from contact with the pallet jack.

The third aspect of the present invention further comprising: a strap attached to the substantially vertical portion, wherein the strap is configured to substantially securely retain a pallet placed on the left and right tines, and wherein the pallet is configured to contain one or more beverage trays, and wherein each of the one or more trays is configured to retain one or more beverage bottles.

According to the third aspect of the present invention the strap comprises: a retractable strap configured to retract into a strap container such that the retractable strap is substantially prevented from inadvertently coming into contact with other objects, and wherein each of the left and right the rear wheels comprises: a locking wheel that can be manually locked to substantially prevent inadvertent rolling of the pallet jack.

A fourth aspect of the present invention provides a pallet jack wherein the choice of front and rear wheels are such that their aspect ratio maximizes the ability of the pallet jack to navigate rough terrain. Accordingly, a fourth aspect of the present invention provides a pallet jack, comprising: a left tine and a right tine, of substantially similar length, wherein the left and right tines are substantially planar and substantially parallel to each other; a lifting mechanism configured to lift the left and right tines; a pallet jack body attached to a rear-most portion of each of the left and right tines, the pallet jack body including a substantially vertical backing portion attached to each of the rear-most portion of the left and right tines, and a substantially horizontal portion attached to a lowermost portion of the substantially vertical backing portion, and wherein the lifting mechanism is attached to the substantially horizontal portion of the pallet jack body along a centerline of the pallet jack; a left front wheel located and rotationally attached to a front-most portion of the left tine; a right front wheel located and rotationally attached to a front-most portion of the right tine; and a left rear wheel; and a right rear wheel, wherein each of the left rear wheel and the right rear wheel has an aspect ratio between about 5 and about 18, and each of the left front wheel and the right front wheel has an aspect ratio between about 4 and about 14, and wherein, the respect aspect ratios of the front wheels and rear wheels enable the pallet jack to have an improved ability to navigate both substantially non-smooth exterior surfaces and surfaces that include gravel, holes, cracks and differences in height.

According to the fourth aspect of the present invention the left rear wheel is located at a first distance from the centerline of the pallet jack, and the right rear wheel is located at a second distance from the centerline of the pallet jack, and further wherein the first distance equals the second distance such that the left rear wheel and the right rear wheel are located equidistant from the centerline, and wherein the pallet jack is configured to transport a pallet, and wherein the pallet is configured to be loaded with packaged goods.

According to the fourth aspect of the present invention the pallet is further configured to be loaded with one or more trays, and wherein each of the one or more trays is configured to hold one or more beverage bottles.

According to the fourth aspect of the present invention the pallet jack further comprises: a substantially horizontal plate, wherein the substantially horizontal portion of the pallet jack body, the lifting mechanism, and the left and right rear wheels are fixedly connected to the substantially horizontal plate.

The fourth aspect of the present invention further comprising: a rear guard portion located along substantially all of an outermost portion of the substantially horizontal plate, wherein, the rear guard portion is configured to protect the pallet jack from contact with other objects, and the rear guard portion is further configured to protect other objects from contact with the pallet jack.

According to the fourth aspect of the present invention the lifting mechanism operates pneumatically, the lifting mechanism operates electrically, or the lifting mechanism operates hydraulically.

The fourth aspect of the present invention further comprising: a left guard portion located on an outermost portion of the left tine; and a right guard portion located on an outermost portion of the right tine, wherein the left and right guard portion are each configured to protect the pallet jack from contact with other objects, and the left and right guard portion are each further configured to protect other objects from contact with the pallet jack.

The fourth aspect of the present invention further comprising: a strap attached to the substantially vertical portion, wherein the strap is configured to substantially securely retain a pallet placed on the left and right tines, and wherein the pallet is configured to contain one or more beverage trays, and wherein each of the one or more trays is configured to retain one or more beverage bottles.

According to the fourth aspect of the present invention the strap comprises: a retractable strap configured to retract into a strap container such that the retractable strap is substantially prevented from inadvertently coming into contact with other objects, and wherein each of the left and right the rear wheels comprises: a locking wheel that can be manually locked to substantially prevent inadvertent rolling of the pallet jack.

According to the fourth aspect of the present invention, each of the left rear wheel and the right rear wheel has an aspect ratio of about 8, and each of the left front wheel and the right front wheel has an aspect ratio of about 6.

A fifth aspect of the present invention provides a pallet jack comprising semi circular handles located at an upper location of the vertical portion of the pallet jack to assist in maneuvering the pallet jack over substantially non-smooth terrain. Accordingly, a fifth aspect of the present invention provides a pallet jack, comprising: a left tine and a right tine, of substantially similar length, wherein the left and right tines are substantially planar and substantially parallel to each other; a lifting mechanism configured to lift the left and right tines; a pallet jack body attached to a rear-most portion of each of the left and right tines, the pallet jack body including a substantially vertical backing portion attached to the rear-most portion of each of the left and right tines, and a substantially horizontal portion attached to a lowermost portion of the substantially vertical backing portion, and wherein the lifting mechanism is attached to the substantially horizontal portion of the pallet jack body along a centerline of the pallet jack; a left side handle located at an uppermost portion of a left side of the substantially vertical portion of the pallet jack body; a right side handle located at an uppermost portion of a right side of the substantially vertical portion of the pallet jack body; a substantially horizontal bar connected to both of the left side handle and the right side handle, wherein the substantially horizontal bar is positioned to enable the pallet jack to have an improved ability to navigate substantially non-smooth exterior surfaces and/or surfaces that include gravel, holes, cracks and/or differences in height; a front left wheel located and rotationally attached to a front-most portion of the left tine; a front right wheel located and rotationally attached to a front-most portion of the right tine; and a rear left wheel and a rear left wheel.

According to the fifth aspect of the present invention the left and right handles and substantially horizontal bar are configured to enable the pallet jack to have an enhanced ability to traverse a ramp from a first lower surface to a second upper surface, and wherein the pallet jack is configured to transport a pallet, and wherein the pallet is configured to be loaded with packaged goods.

According to the fifth aspect of the present invention the pallet is further configured to be loaded with one or more trays, and wherein each of the one or more trays is configured to hold one or more beverage bottles.

According to the fifth aspect of the present invention the pallet jack further comprises: a substantially horizontal plate, wherein the substantially horizontal portion of the pallet jack body, the lifting mechanism, and the left and right rear wheels are fixedly connected to the substantially horizontal plate, and wherein the pallet jack further comprises a rear guard portion located along substantially all of an outermost portion of the substantially horizontal plate, wherein, the rear guard portion is configured to protect the pallet jack from contact with other objects, and the rear guard portion is further configured to protect other objects from contact with the pallet jack.

According to the fifth aspect of the present invention the lifting mechanism operates pneumatically, the lifting mechanism operates electrically, or the lifting mechanism operates hydraulically.

The fifth aspect of the present invention further comprising: a left guard portion located on an outermost portion of the left tine; and a right guard portion located on an outermost portion of the right tine, wherein the left and right guard portion are each configured to protect the pallet jack from contact with other objects, and the left and right guard portion are each further configured to protect other objects from contact with the pallet jack.

The fifth aspect of the present invention further comprising: a strap attached to the substantially vertical portion, wherein the strap is configured to substantially securely retain a pallet placed on the left and right tines, and wherein the pallet is configured to contain one or more beverage trays, and wherein each of the one or more trays is configured to retain one or more beverage bottles.

According to the fifth aspect of the present invention the strap comprises: a retractable strap configured to retract into a strap container such that the retractable strap is substantially prevented from inadvertently coming into contact with other objects, and wherein each of the left and right the rear wheels comprises: a locking wheel that can be manually locked to substantially prevent inadvertent rolling of the pallet jack.

A sixth aspect of the present invention provides a pallet jack that includes a means for holding a handheld device to update delivery status. Accordingly, a sixth aspect of the present invention provides a pallet jack, comprising: a left tine and a right tine, of substantially similar length, wherein the left and right tines are substantially planar and substantially parallel to each other; a lifting mechanism configured to lift the left and right tines; a pallet jack body attached to a rear-most portion of each of the left and right tines, the pallet jack body including a substantially vertical backing portion attached to the rear-most portion of each of the left and right tines, and a substantially horizontal portion attached to a lowermost portion of the substantially vertical backing portion, and wherein the lifting mechanism is attached to the substantially horizontal portion of the pallet jack body along a center line of the pallet jack; a front left wheel located and rotationally attached to a front-most portion of the left tine; a front right wheel located and rotationally attached to a front-most portion of the right tine; a rear left wheel and a rear left wheel; a pallet jack identification tag; and a means for carrying a hand holdable device wherein the hand holdable device is configured to update an order status relating to one or more products contained in a pallet being retained by the pallet jack.

According to the sixth aspect of the present invention the hand holdable device is an electronic device that transmits the order status data via RF to a base station, and wherein the means for holding the hand holdable device comprises: a plug configured to lock into a jack located on a rear portion of the hand holdable device, thereby fixedly attaching the hand holdable device to the pallet jack.

According to the sixth aspect of the present invention the means for holding the hand holdable device comprises: a tray affixed to the substantially vertical portion of the pallet jack body, and wherein the pallet jack is configured to transport a pallet, and wherein the pallet is configured to be loaded with packaged goods.

According to the sixth aspect of the present invention the pallet is further configured to be loaded with one or more trays, and wherein each of the one or more trays is configured to hold one or more beverage bottles.

According to the sixth aspect of the present invention the pallet jack further comprises: a substantially horizontal plate, wherein the substantially horizontal portion of the pallet jack body, the lifting mechanism, and the left and right rear wheels are fixedly connected to the substantially horizontal plate.

The sixth aspect of the present invention further comprising: a rear guard portion located along substantially all of an outermost portion of the substantially horizontal plate, wherein, the rear guard portion is configured to protect the pallet jack from contact with other objects, and the rear guard portion is further configured to protect other objects from contact with the pallet jack.

According to the sixth aspect of the present invention the lifting mechanism operates pneumatically, the lifting mechanism operates electrically, or the lifting mechanism operates hydraulically.

The sixth aspect of the present invention further comprising: a left guard portion located on an outermost portion of the left tine; and a right guard portion located on an outermost portion of the right tine, wherein the left and right guard portion are each configured to protect the pallet jack from contact with other objects, and the left and right guard portion are each further configured to protect other objects from contact with the pallet jack.

The sixth aspect of the present invention further comprising: a strap attached to the substantially vertical portion, wherein the strap is configured to substantially securely retain a pallet placed on the left and right tines, and wherein the pallet is configured to contain one or more beverage trays, and wherein each of the one or more trays is configured to retain one or more beverage bottles.

According to the sixth aspect of the present invention the strap comprises: a retractable strap configured to retract into a strap container such that the retractable strap is substantially prevented from inadvertently coming into contact with other objects, and wherein each of the left and right the rear wheels comprises: a locking wheel that can be manually locked to substantially prevent inadvertent rolling of the pallet jack.

A seventh aspect of the present invention provides a method of using the pallet jack to deliver goods to a desired position and to update a status of delivery of the goods, comprising: loading a pallet with packaged goods, wherein the pallet includes a set of stacking feet, the set of stacking feet including a first set on a left side of the pallet, and a second set on the right side of the pallet, and wherein each of the first set of stacking feet is located at a predetermined distance from the left side of the pallet, and each includes an angled surface on a bottom portion of the respective stacking foot, wherein the angled surface has an angle that is calculated to reduce a likelihood of interference with an inclined ramp when the pallet traverses the ramp, and wherein each of the second set of stacking feet is located at a predetermined distance from the right side of the pallet, and each includes an angled surface on a bottom portion of the respective stacking foot, wherein the angled surface has an angle that is calculated to reduce a likelihood of interference with an inclined ramp when the pallet traverses the ramp; positioning a left tine of the pallet jack adjacent to an exterior surface of each of the first set of stacking feet; positioning a right tine of the pallet jack adjacent to an exterior surface of each of the second set of stacking feet; lifting the left and right tines such that the loaded pallet rests upon the left and right tines; maneuvering the pallet jack to the ramp; traversing the ramp; delivering the loaded pallet to the desired location; and updating a delivery status through use of a remote hand holdable device.

The seventh aspect of the present invention further comprising: strapping the loaded pallet to the pallet jack such that shifting and movement of the loaded pallet with respect to the pallet jack is substantially prevented during the steps of maneuvering, traversing and delivering, and wherein the step of lifting comprises: operating a pneumatic lift device to lift the left and right tines.

According to the seventh aspect of the present invention the step of lifting comprises: operating a hydraulic lift device to lift the left and right tines.

According to the seventh aspect of the present invention the step of lifting comprises: operating an electric lift device to lift the left and right tines.

The seventh aspect of the present invention further comprising: wrapping the loaded pallet with a covering, and wherein the step of wrapping comprises: wrapping the loaded pallet with a plastic covering; applying heat to the plastic covering; and shrinking the heated plastic covering to more securely affix the loaded product to the pallet.

According to the seventh aspect of the present invention the step of delivering further comprises: unwrapping the shrunken plastic covering that covers the product loaded onto the pallet. According to the seventh aspect of the present invention the loaded product comprises: one or more beverage bottles substantially filled with a soft drink beverage product, and the step of delivering the loaded pallet to the desired location comprises: placing the loaded pallet at a specific location within a facility such that a consumer can directly select the product loaded onto the pallet.

An eighth aspect of the present invention provides a pallet jack, comprising: a left tine, a center tine, and a right tine, each having a substantially similar length, wherein each of the left, center and right tines is substantially co-planar and substantially parallel with respect to each other, and wherein the center tine has a width that is about two times as wide as a corresponding width of each of the left tine and right tine, such that the pallet jack is configured to lift a first pallet and a second pallet in a side-by-side configuration on the left tine, center tine and right tine, wherein the left pallet rests upon the left tine and a left portion of the center tine, and the right pallet rests upon the right tine and a right portion of the center tine; a lifting mechanism configured to lift the left, center and right tines; and a pallet jack body attached to a rear-most portion of each of the left, center, and right tines.

According to the eighth aspect of the present invention, the pallet jack is configured to transport at least one of the first and second pallets, and wherein at least one of the first and second pallets is configured to be loaded with packaged goods. Still further according to the eighth aspect of the present invention, at least one of the first and second pallets is further configured to be loaded with one or more trays, and wherein each of the one or more trays is configured to hold one or more beverage bottles.

According to the eighth aspect of the present invention, the lifting mechanism operates pneumatically, the lifting mechanism operates electrically, and the lifting mechanism operates hydraulically. The pallet jack according to the eighth aspect of the present invention further comprises a substantially vertical portion; and a strap attached to the substantially vertical portion, wherein the strap is configured to substantially securely retain each of the first pallet and the second pallet placed on the left, center and right tines, and wherein at least one of the first pallet and the second pallet is configured to contain one or more beverage trays, and wherein each of the one or more trays is configured to retain one or more beverage bottles.

According to a ninth aspect of the present invention, a pallet jack is provided, comprising: a left tine, a center tine, and a right tine, each having a substantially similar length, wherein each of the left tine, center tine, and right tine is substantially parallel to each other, and wherein the center tine includes a first raised area, and the right tine includes a second raised area, such that the pallet jack is configured to lift a first pallet and a second pallet in a side-by-side configuration on the left tine, center tine and right tine, wherein the first pallet rests upon the left tine and a left portion of the center tine, and the second pallet rests upon the second raised area on the right tine and the first raised area on a right portion of the center tine, such that the second pallet is carried at a different height with respect to the first pallet; a lifting mechanism configured to lift the left tine, center tine, and right tine; and a pallet jack body attached to a rear-most portion of each of the left, center, and right tines.

According to a ninth aspect of the present invention, a width of each of the first and second raised areas is about one-half a corresponding width of the center tine, and wherein a height of each of the first and second raised area is substantially equal to each other, and is between about 0.5 inches and about 0.75 inches. According to the ninth aspect of the present invention, the different height that the second pallet is carried with respect to a height of the first pallet is between about 0.5 inches and about 0.75 inches. Still further according to the ninth aspect of the present invention, the pallet jack is configured to transport at least one of the first and second pallets, and wherein at least one of the first and second pallets is configured to be loaded with packaged goods.

According to the ninth aspect of the present invention, the pallet jack at least one of the first and second pallets is further configured to be loaded with one or more trays, and wherein each of the one or more trays is configured to hold one or more beverage bottles. Still further according to the ninth aspect of the present invention, the lifting mechanism operates pneumatically, the lifting mechanism operates electrically, and the lifting mechanism operates hydraulically.

According to the ninth aspect of the present invention, the pallet jack further comprises a substantially vertical portion; and a strap attached to the substantially vertical portion, wherein the strap is configured to substantially securely retain each of the first pallet and the second pallet placed on the left, center and right tines, and wherein at least one of the first pallet and the second pallet is configured to contain one or more beverage trays, and wherein each of the one or more trays is configured to retain one or more beverage bottles.

According to a tenth aspect of the present invention, a method for using a pallet jack comprising a left tine, a center tine, and a right tine, is provided, the method comprising the steps of: placing the left tine under a left pallet to an exterior side of left stacking feet of the left pallet; placing the center tine under the left pallet to an exterior side of right stacking feet of the left pallet; placing a first raised area of the center tine under a right pallet to an exterior side of left stacking feet of the right pallet; placing a second raised area of the right tine under the right pallet to an exterior side of right stacking feet of the right pallet, such that, the right pallet rests at a first height that is higher than a corresponding resting height of the left pallet; raising the left tine, center tine, and right tine simultaneously, thereby lifting both the left pallet and the right pallet; placing the left pallet in a first location; and placing the right pallet in a second location.

According to the tenth aspect of the present invention, the first location is substantially adjacent to the second location, and the step of placing the left pallet in the first location comprises: placing the left pallet in the first location without placing the right pallet on a surface associated with the first location. Still further according to the tenth aspect of the present invention, the second location comprises a location not substantially adjacent to the first location.

BRIEF DESCRIPTION OF THE DRAWINGS

The novel features and advantages of the present invention will best be understood by reference to the detailed description of the preferred embodiments that follows, when read in conjunction with the accompanying drawings, in which:

FIG. 4 illustrates a left side view of the pallet jack shown in FIG. 3.

FIG. 34 illustrates a sectional front view of the pallet jack shown in FIGS. 31 and 32 according to an embodiment of the present invention.

FIG. 36 illustrates a partial sectional front view of the pallet jack shown in FIG. 35.

FIG. 37 illustrates a sectional view of the pallet jack similar to that of FIG. 36 but with two pallets loaded on the pallet jack shown in FIG. 35 according to an embodiment of the present invention.

DETAILED DESCRIPTION OF THE PREFERRED EMBODIMENTS

Figure 1:
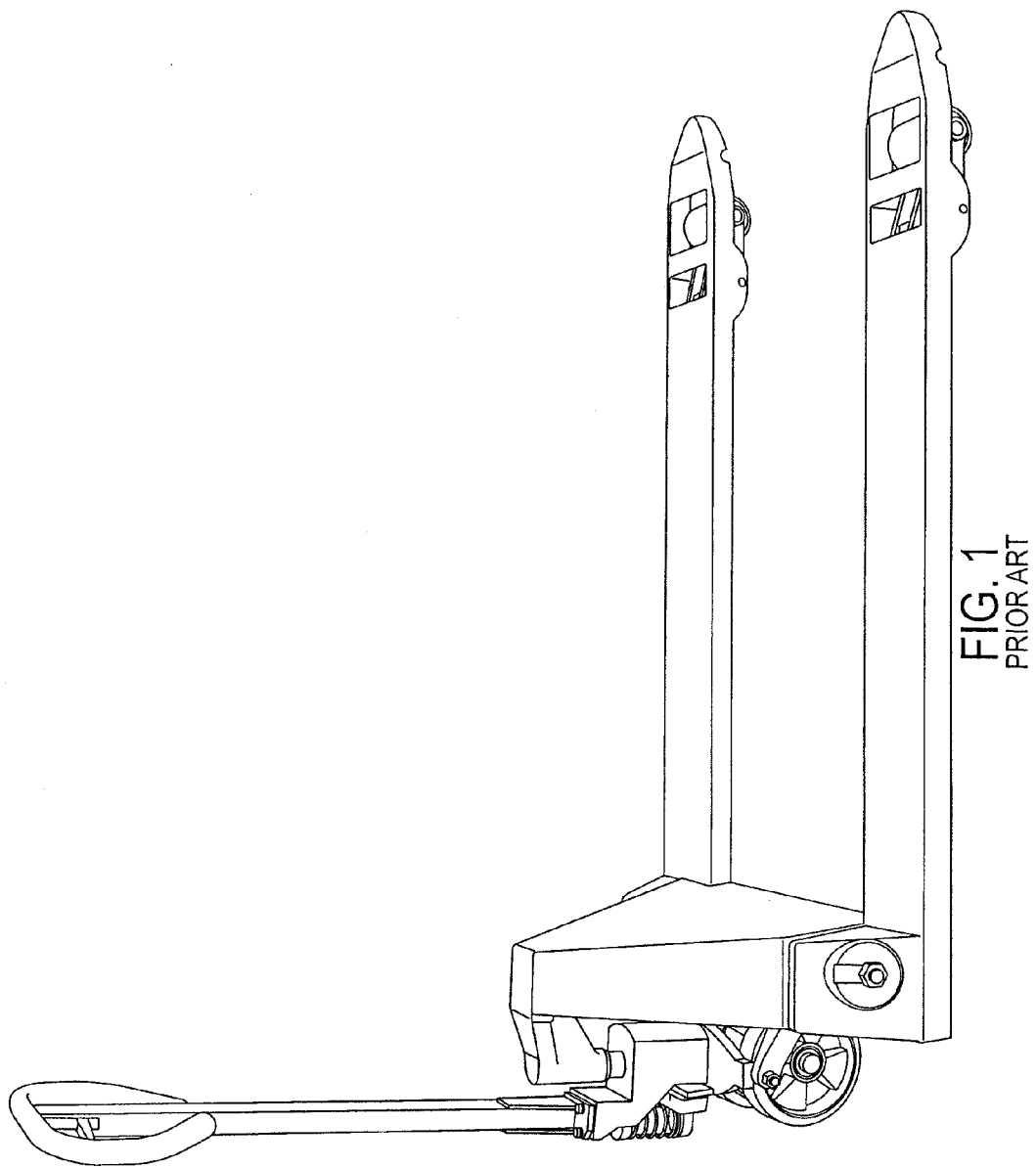
FIG. 1 illustrates a prior art pallet jack.
Figure 2:
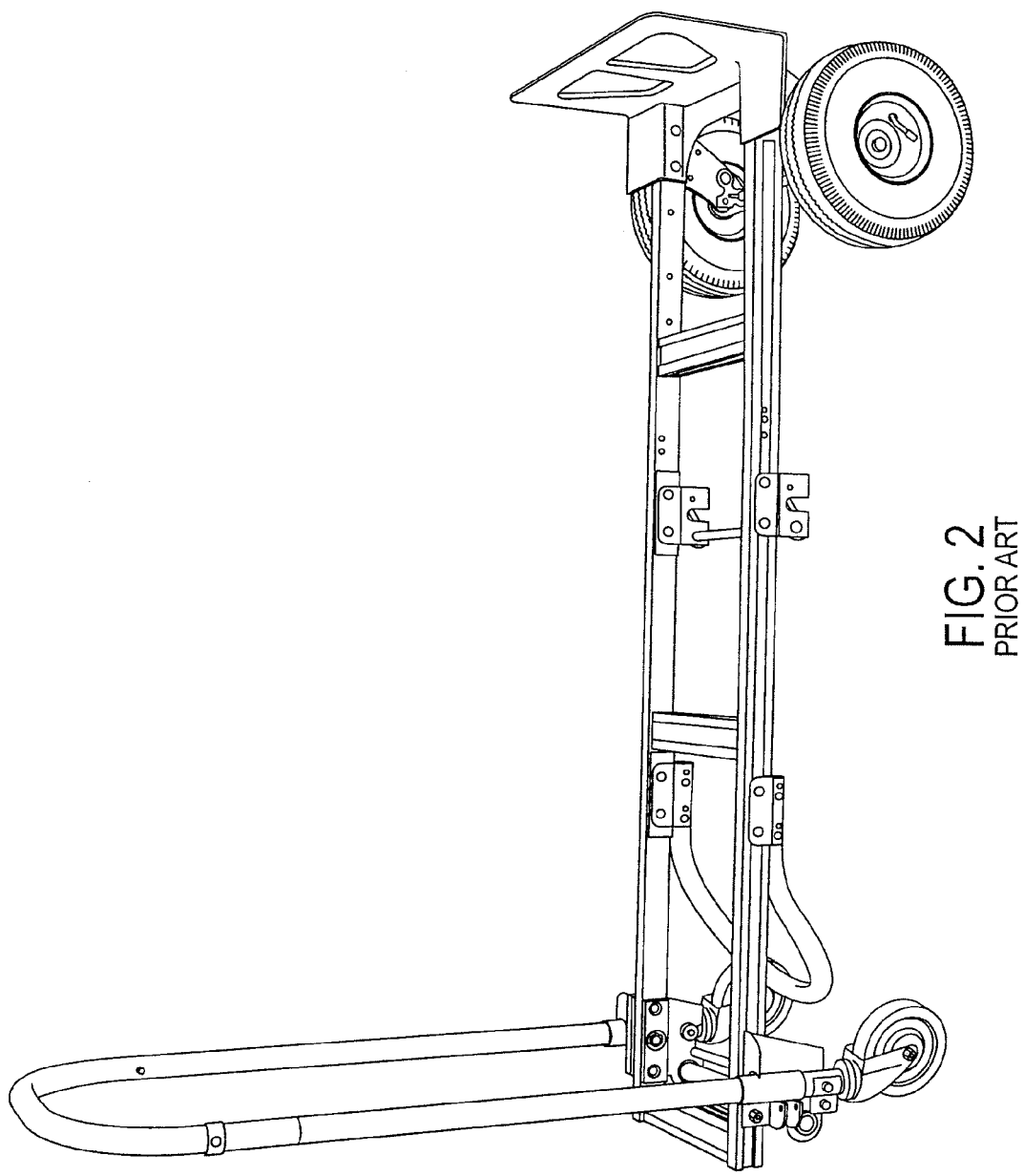
FIG. 2 illustrates a prior art dolly.
Figure 3:
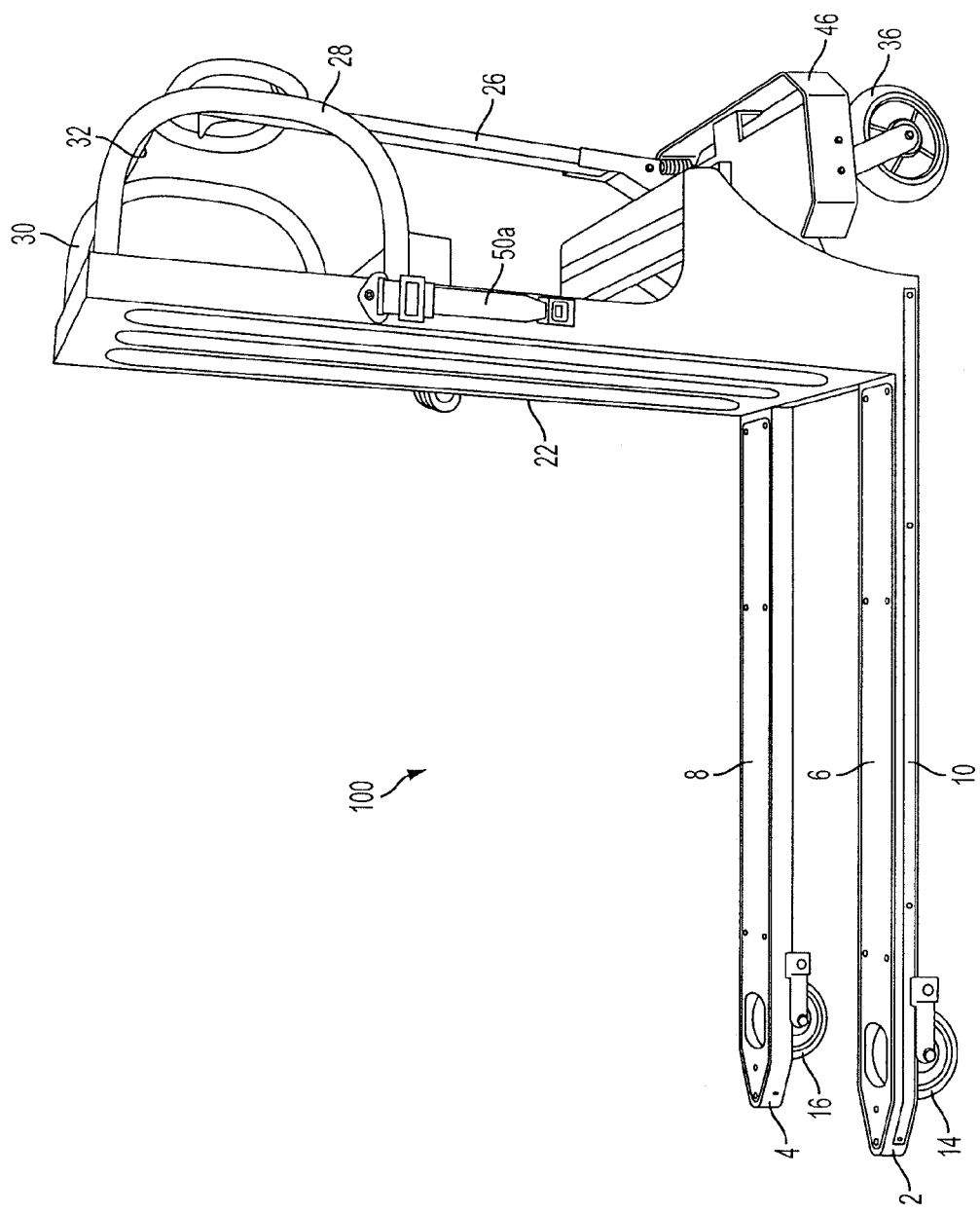
FIG. 3 illustrates a left side isometric view of a pallet jack according to an embodiment of the present invention.
Figure 5:
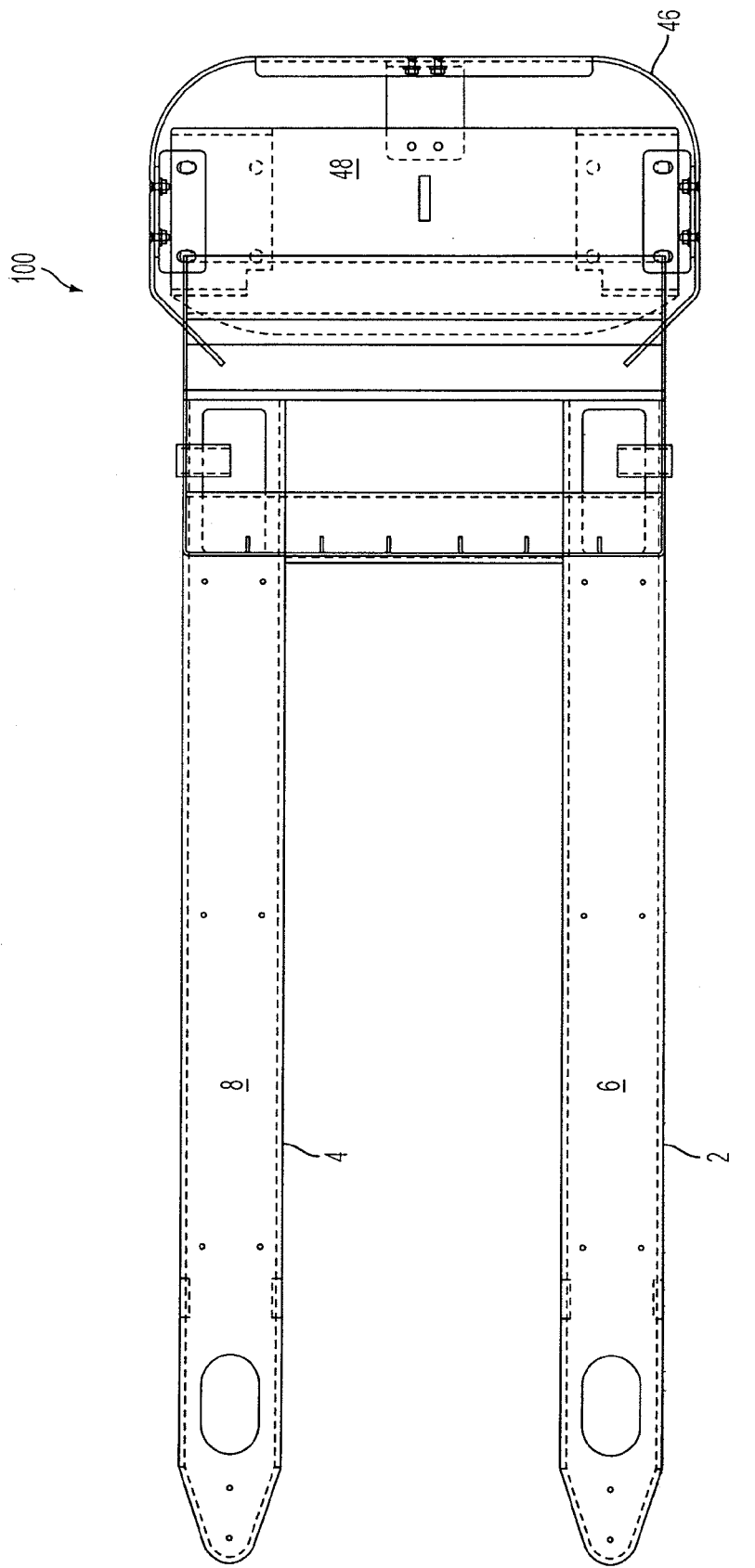
FIG. 5 illustrates a top view of the pallet jack shown in FIG. 3.
Figure 6:
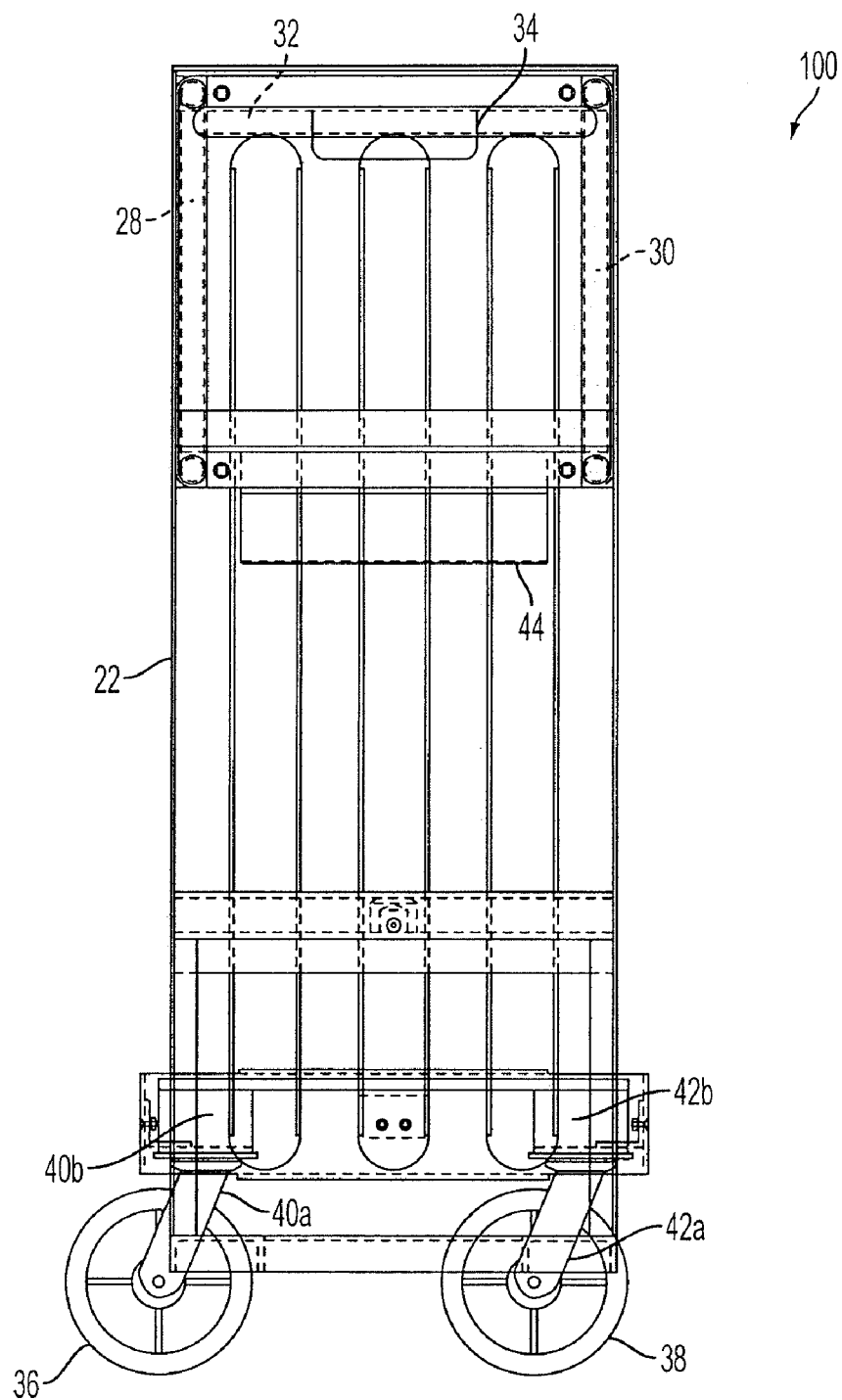
FIG. 6 illustrates a rear view of the pallet jack shown in FIG. 3.
Figure 7:
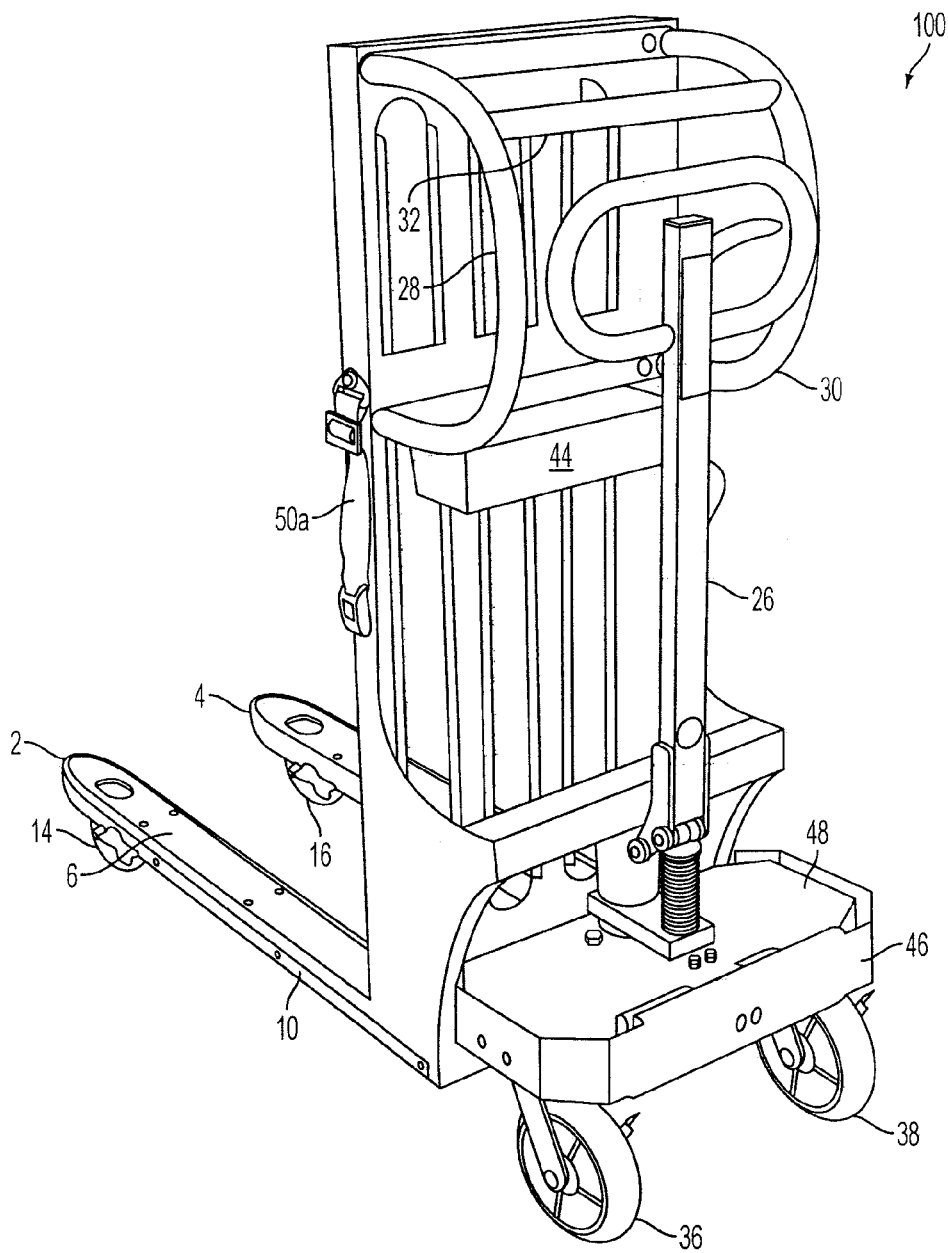
FIG. 7 illustrates a left rear isometric side view of the pallet jack shown in FIG. 3.
Figure 8:
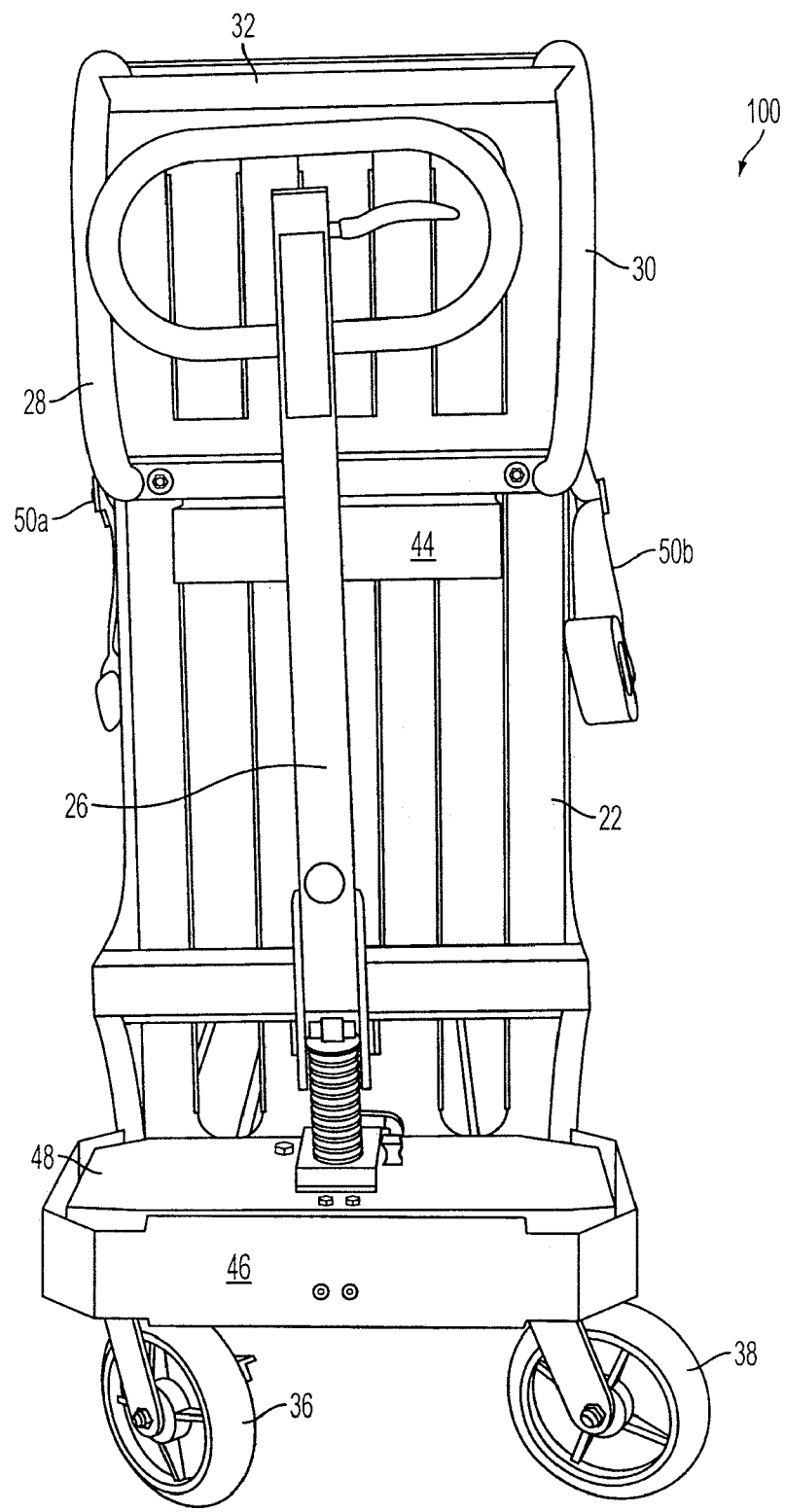
FIG. 8 illustrates a rear view of the pallet jack shown in FIG. 3.
Figure 9:
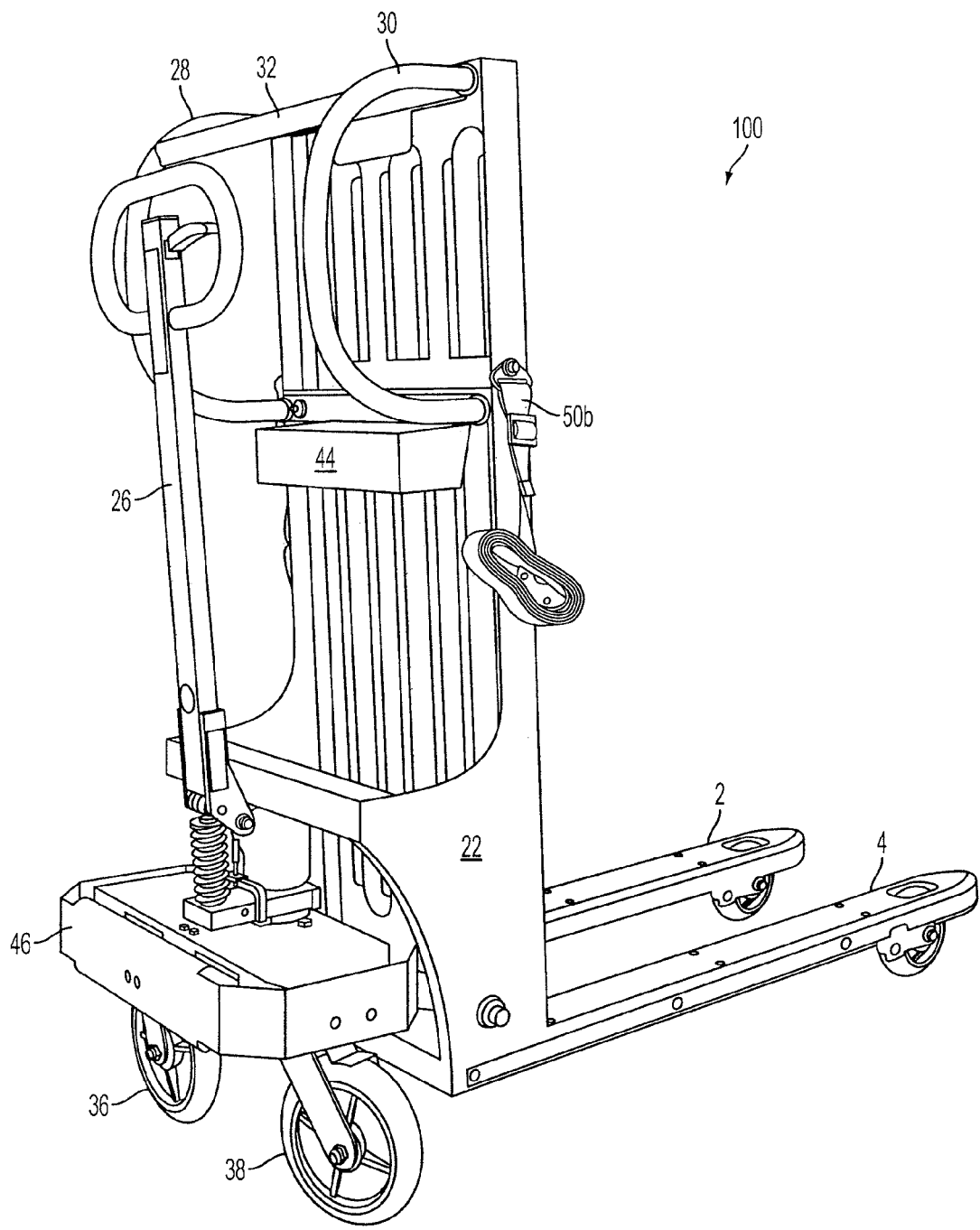
FIG. 9 illustrates right rear isometric side view of the pallet jack shown in FIG. 3.
Figure 10:
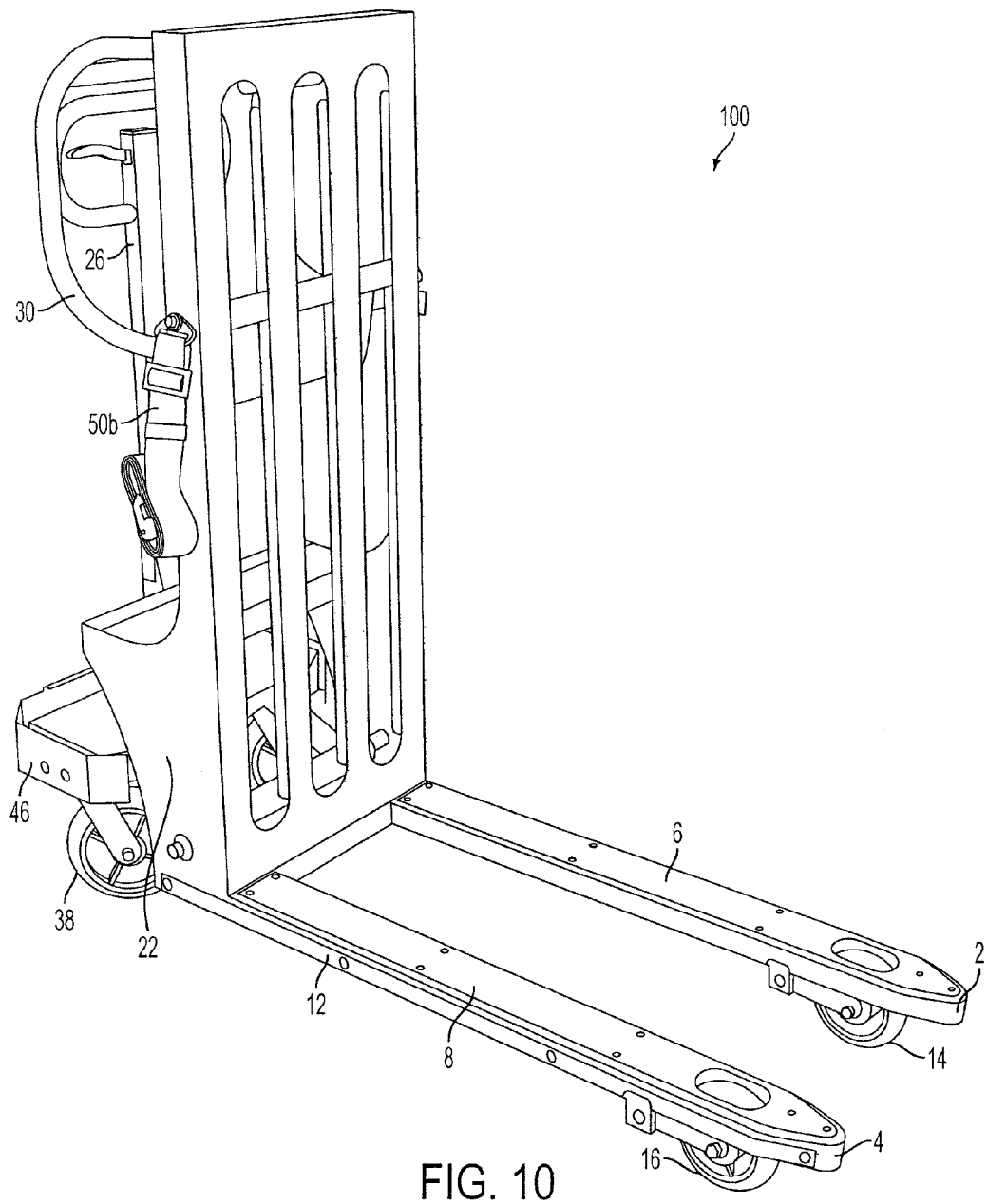
FIG. 10 illustrates right front isometric side view of the pallet jack shown in FIG. 3.
Figure 11:
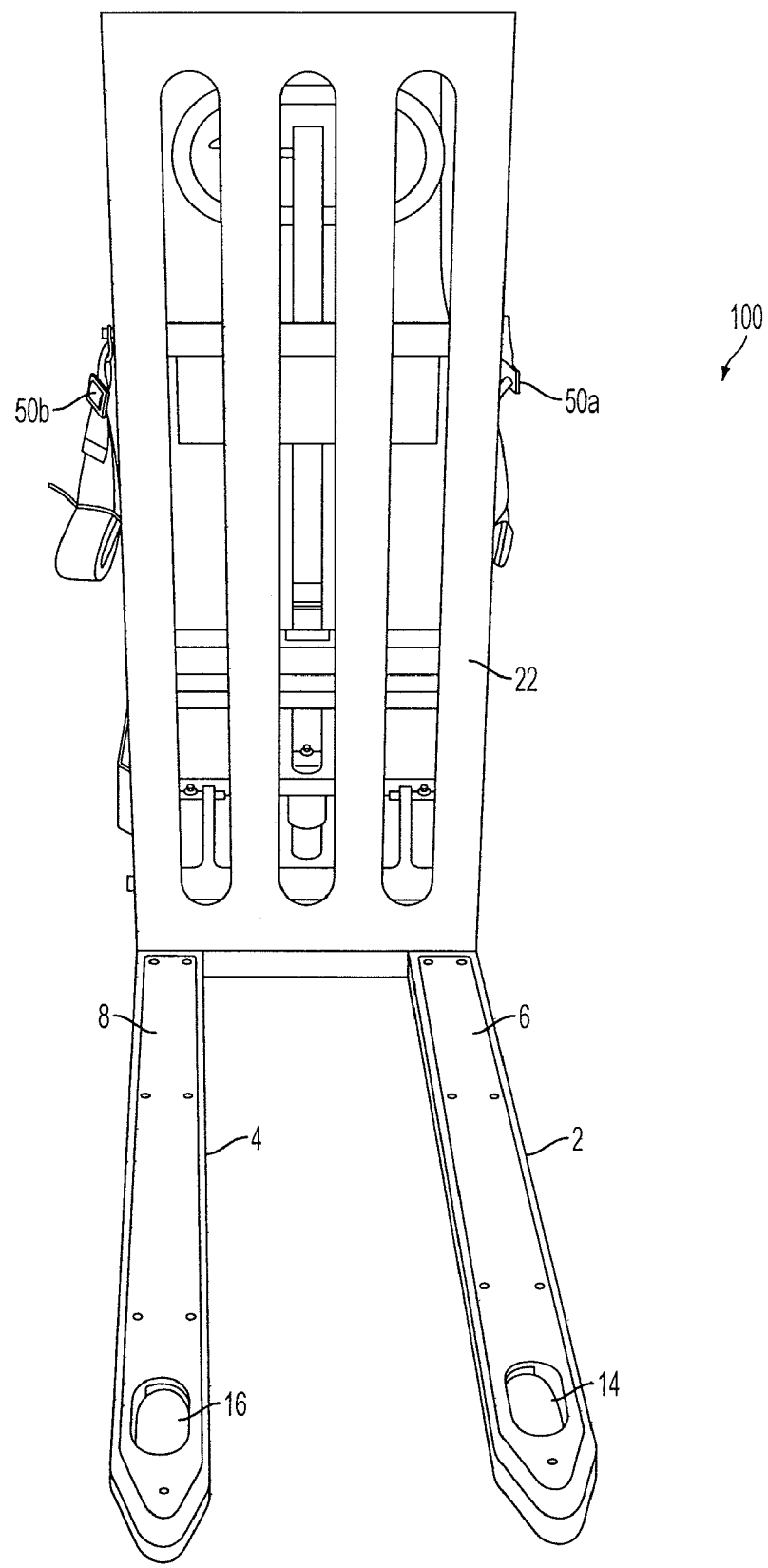
FIG. 11 illustrates front view of the pallet jack shown in FIG. 3.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

I. Overview of the Invention

According to an embodiment of the present invention, a new and improved pallet jack 100 is disclosed and described herein with a number of significant advantages. Pallet jack 100 comprises left and right tines 2, 4, attached to a frontmost portion of which are left and right front wheels 14, 16. Left and right front wheels have an aspect ratio (defined as the ratio of the diameter (or height) of the wheel to its width (D/W)) of at least about 1.0, 2.0 or more. Pallet jack 100 further comprises left and right rear wheels 36, 38 with aspect ratios of at least about 1.0, 2.0 or more. Left and right rear wheels 36, 38, furthermore, are located at outermost portions of pallet jack body 22, as opposed to under lifting mechanism assembly 24, as is generally the case for interior-use only pallet jacks. The location and aspect ratio of left and right rear wheels 36, 38, as well as the aspect ratio of left and right front wheels 36, 38 enables pallet jack 100 to have enhanced stability for navigating substantially non-smooth terrain, such as in a gravel parking lots outside convenience stores, or parking lots wherein the pavement has been eroded over time to produce potholes, and cracks. Known pallet jacks, with their centrally located rear wheels, and front wheels with aspect ratios of much less than 1.0, would not be able to safely navigate and transport goods from a delivery vehicle to the store under those conditions.

Pallet jack 100, according to an embodiment of the present invention, further includes the features of bumper guards 10, 12 on left and right tines 2, 4, and the rear side of pallet jack 100. At the top of pallet jack body 22 are located two semi-circular handles 28, 30, which are joined by a handle bar connector 32 that enables an operator to easily traverse the substantially non-smooth terrain of the gravel or pot-hole marked parking lot. Further, the selected wheels of the pallet jack 100 will prevent scuffing of polished floors inside convenience stores. Straps 50a, b are added to enable the operator to even more securely store goods on pallet 62 during transport, thereby substantially preventing shifting with respect to pallet jack 100. According to further embodiments of the present invention, basket 44 is located on the rear of pallet jack body 22, to store items such as writing instruments, copies of orders, and things of that nature. At the top of pallet jack body 22, on the rear side, is located a plurality of jacks 58a, b to hold RF electronic devices that allow an operator to electronically update orders upon delivery, and take new orders simultaneously. The RF electronic device records the orders and automatically updates them to a central inventory control center, as those of ordinary skill in the art can appreciate.

According to still a further embodiment of the present invention, pallet jack 100 is designed to be used with a novel pallet 62, described in co-pending U.S. Non-provisional patent application Ser. No. 11/615,635, entitled "Stackable Packaged Goods Pallet, filed on Dec. 22, 2006, the entire contents of which are expressly incorporated herein by reference. Left and right tines 2, 4 of pallet jack 100, according to an embodiment of the present invention, are designed to fit adjacent to an exterior wall or surface of the stacking feet of pallet 62, thereby providing enhanced stability to loaded pallet 62 when transporting it. According to still a further embodiment of the present invention, pallet jack 100 traverses a ramp 68 from a first lower surface to a second upper surface when delivering goods to a location, preferably a convenience store. According to a preferred embodiment of the present invention, pallet jack 100 is used to deliver consumer beverages to convenience or grocery stores. Pallet pack 100 can be used to lift pallet 62 that has been loaded with any consumer or even wholesale type item. According to an exemplary embodiment of the present invention, pallet 62 can be loaded with any type of packaged goods. For example, according to exemplary embodiments of the present invention, pallets 62 can be loaded with consumer goods such as automobile parts, personal items for sale in convenience and drug stores, food items, printed materials, and raw materials such as lumber, hardware and many other items.

According to a preferred embodiment of the present invention, pallet jack 100 can be used lift pallets 62 that have been previously loaded with consumer beverages (usually soft drinks, but in some cases, flavored water and other drinks) and wherein pallets 62 have been wrapped in plastic, preferably a flexible shrink wrap material. Thus, the loaded pallet 62 can itself be referred to as a single unitary good (i.e., Coke®/Diet Coke® (soft drink) pallet) that can be delivered to a retail location. According to a preferred embodiment of the present invention, a plurality of these soft drink pallets are loaded into delivery vehicles (which can be delivery vehicles of many different sizes and configurations) that can then be driven to various retail locations. According to a preferred embodiment of the present invention, the retail locations are convenience stores. At the convenience stores, the operator uses pallet jack 100 to lift and deliver soft drink pallet 62. No additional lifting of the goods being delivered by an operator is required. The entire loaded soft drink pallet 62 is left behind, and empty pallets 62 can be retrieved. According to an exemplary embodiment of the present invention, pallet 62 is between about 15" to about 21" in width, between about 45" and 50" in length, and between about 7" and 10" in height. According to a preferred embodiment of the present invention, pallet 62 is about 18" in width, 47.5" in length, and about 8.5" in height. Pallet jack 100 allows the operator to easily and safely navigate substantially uneven terrain, such as gravel parking lots, or those parking lots that have developed cracks, fissures, or potholes. Pallet jack 100 can be used to safely deliver loaded pallets 62 to any type of building or facility, whether it be a retail, wholesale or warehouse type facility. These and other inventive features shall now be described in greater detail below.

II. Detailed Description of the Several Embodiments

A. Pallet Body

As shown in FIGS. 3, 4, 7, and 9 through 11, pallet jack 100 comprises several main components: these include left and right tines 2, 4, pallet jack body 22, lifting mechanism assembly 24, left and right front wheels 14,16, left and right rear wheels 36, 38, and left and right semi-circular handle bars 28, 30. Left and right tines 2, 4 are each connected at their rearmost portion to pallet jack body 22, which is a substantially massive component designed to counter the significant weight of beverage products or other loaded packaged goods that pallet jack is designed to lift and carry. According to a preferred embodiment of the present invention, pallet jack body 22 is made of steel, and weighs approximately 300 Lbs. Pallet jack body 22 further includes a plurality of substantially vertical segments that form a barrier or wall against which the beverage products will, at times, rest. The overall dimensions of pallet jack 100 are between about 3' to about 5' high, between about 1.5° to about 2' wide, and between about 3' to about 5' long. According to a preferred embodiment of the present invention, the overall dimensions of pallet jack 100 are about 48" high, about 19" wide, and about 45" long.

Pallet jack body 22 forms the foundation for pallet jack 100, as the other components of pallet jack 100 are attached to it. At a bottommost front portion are left and right tines 2, 4, and attached to an uppermost portion, at the rear, are left and right handle bars 28, 30. Attached to a middle portion on the rear of pallet jack body 22 is tray 44, and attached to the bottommost rear portion of pallet jack 22 is the lifting mechanism assembly 24a-n and lift handle 26. Further still, attached to the bottommost portion of pallet jack body 22 is rear wheel plate 48, attached to which are left and right wheels 36, 38. Also attached towards the uppermost portion of the rear of pallet jack body 100 are a plurality of electronic device holder jacks (jacks) 58a, b, to which can be attached a plurality of electronic sales delivery/order/tracker devices (hand held devices) 60.

B. Tines

Left tine 2 is substantially similar to right tine 4, in that each are substantially parallel to each other, of substantially similar dimensions and configuration, and lie within substantially the same substantially horizontal plane. Left and right tines 2, 4 are connected to pallet jack body 22 at their rear-most portion. Left and right tines 2, 4 include left and right scratch plates 6, 8, respectively, on the top of left and right tines 2, 4. Left and right scratch plates 6, 8 protect the bottom of pallets 62, and assist in preventing them from sliding off left and right tines 2, 4, respectively.

Figure 28:
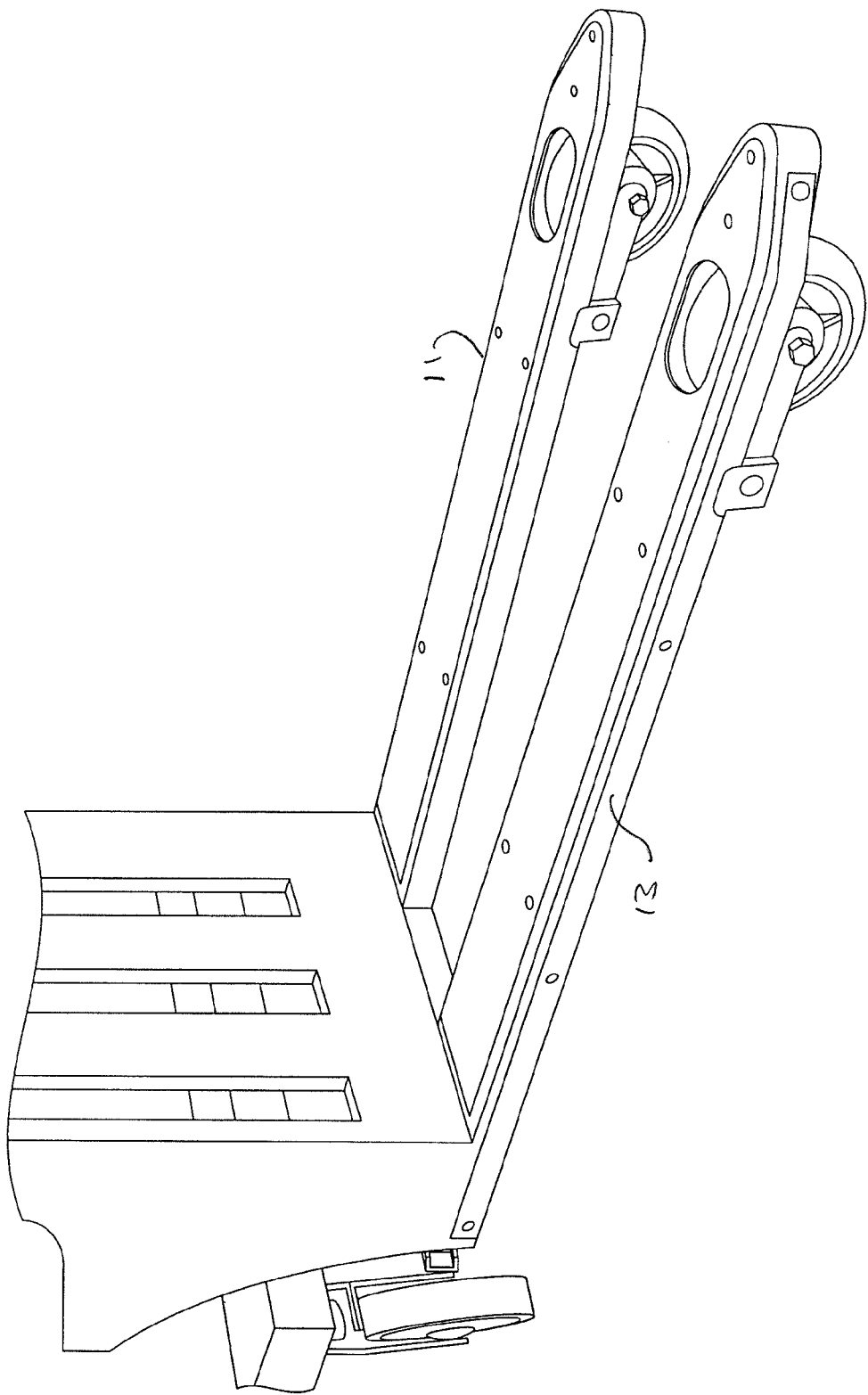
FIG. 28 illustrates an alternative embodiment of a bumper for the left and right tines according to an embodiment of the present invention.

Referring to FIGS. 3, 7, 9, and 10, a first embodiment of left tine bumper 10 and right tine bumper 12 are shown. Left and right tine bumpers 10, 12 protect pallet jack 100 from damage due to inadvertent collisions with delivery vehicles and doors, and things of that nature. Further, left and right tine bumpers 10, 12 protect goods, displays and other items inside stores, warehouses and other locations wherein pallet jack 100 is used to deliver pallets loaded with packaged goods. Left and right tine bumpers 10, 12, according to a first embodiment of the present invention, are preferably made of stainless steel or polished aluminum plate that is about 0.125" thick. As those of ordinary skill in the art can appreciate, left and right tine bumpers 10, 12 can also be made of several different materials, such as plastic, and rubber and still function equally well. FIG. 28 illustrates right tine bumper 13 according to an alternative embodiment of the present invention that is made of ultra high molecular weight rubber that is semi-circular in cross section, with a radius of about 0.5" (left tine bumper 11 according to an alternative embodiment of the present invention is substantially similar to right tine bumper 13). Left and right tine bumpers 11, 13 provide the same protection to pallet jack 100 and goods, displays and other items as does left and right tine bumpers 10, 12. As those of ordinary skill in the art can appreciate, left and right tine bumpers 11, 13 can also be made of several different materials, such as plastic and rubber, and still function equally well.

Further included as part of left and right tines 2, 4 are left and right front wheels 14, 16, and left and right front wheel lifting assembly components 18a-g. Left and right front wheel lifting assembly components 18a-g lift left and right front wheels 14, 16 when an operator jacks handle 26 as is well known to those of ordinary skill in the art of the present invention. Since operation of left and right front wheel lifting assembly components 18a-g are well known to those of ordinary skill, a detailed description thereof has been omitted for the purpose of brevity.

Figure 26:
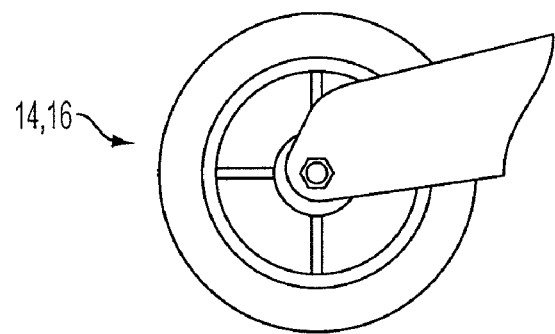
FIG. 26 illustrates a side view of a front wheel used in the pallet jack shown in FIG. 3 according to an embodiment of the present invention.

Left and right front wheels 14, 16 are configured to provide substantial stability and ease of operation when transporting a plurality of loaded pallets 62, especially when such transport occurs on a substantially uneven or non-smooth terrain, as in a gravel parking lot, or one in which the pavement has cracks and/or potholes. FIG. 26 illustrates a preferred embodiment of front wheels 14, 16. According to a preferred embodiment of the present invention, front wheels 14, 16 assist in providing the stability and ease of operation of pallet jack 100 because of their size and dimensions. Typically, the front wheels of pallet jacks are wider then they are tall; according to an embodiment of the present invention, however, left and right front wheels 14, 16 have substantially different measurements. As those of ordinary skill in the art understand, the relationship between height and width can be referred to as an aspect ratio:

$$\text{Aspect Ratio} = \frac{\text{Height of Wheel}}{\text{Width of Wheel}}$$

Accordingly, exemplary embodiments of the present invention uses front wheels 14, 16 that are between about 5" to about 7" in height, and between about 0.5" and 1.5" in width for and aspect ratio that ranges from about 3.3 to about 14. According to a preferred embodiment of the present invention, front wheels 14, 16 are about 6" in height, and about 1" in width, for an aspect ratio of about 6. Accordingly, exemplary embodiments of the present invention uses rear wheels 36, 38 that are between about 7" to about 9" in height, and between about 0.5" and 1.5" in width for and aspect ratio that ranges from about 4.6 to about 18. According to a preferred embodiment of the present invention, rear wheels 36, 38 are about 8" in height, and about 1" in width, for an aspect ratio of about 8.

As discussed above, front wheels with aspect ratios in this range provide pallet jack 100 with the ability to negotiate substantially uneven or non-smooth terrain. Furthermore, because wheels are selected made of the appropriate material, which are not used on known pallet jacks, pallet jack 100 will not scuff or scrape the floor of a convenience store or other retail establishment. According to a preferred embodiment of the present invention, left and right front wheels 14, 16 are made with a rubber compound. According to an alternative embodiment of the present invention, left and right front wheels can be made from rubber or semi-hard plastic.

C. Lifting Mechanism

As discussed above, operation of left and right front wheel lifting assembly components 18a-g are well known to those of ordinary skill in the art of the present invention, and therefore a detailed description thereof has been omitted for the purpose of brevity. The components of left and right front wheel lifting assembly components 18a-g are connected to pallet jack body 22, and as pallet jack body 22 is lifted through operation of lifting mechanism assembly 24a-g, left and right front wheels 14, 16 are lifted and locked into place. As well known to those of ordinary skill in the art of the present invention, lifting mechanism assembly 24 includes several different components as shown, including for example, hydraulic lifting components 24b, g, that are operated by lift handle 26. Furthermore, as those of ordinary skill in the art can appreciate, hydraulic lifting component 24b, g can be replaced by a pneumatic lifting mechanism, or even an electric lifting mechanism.

D. Stability Features

Figure 30:
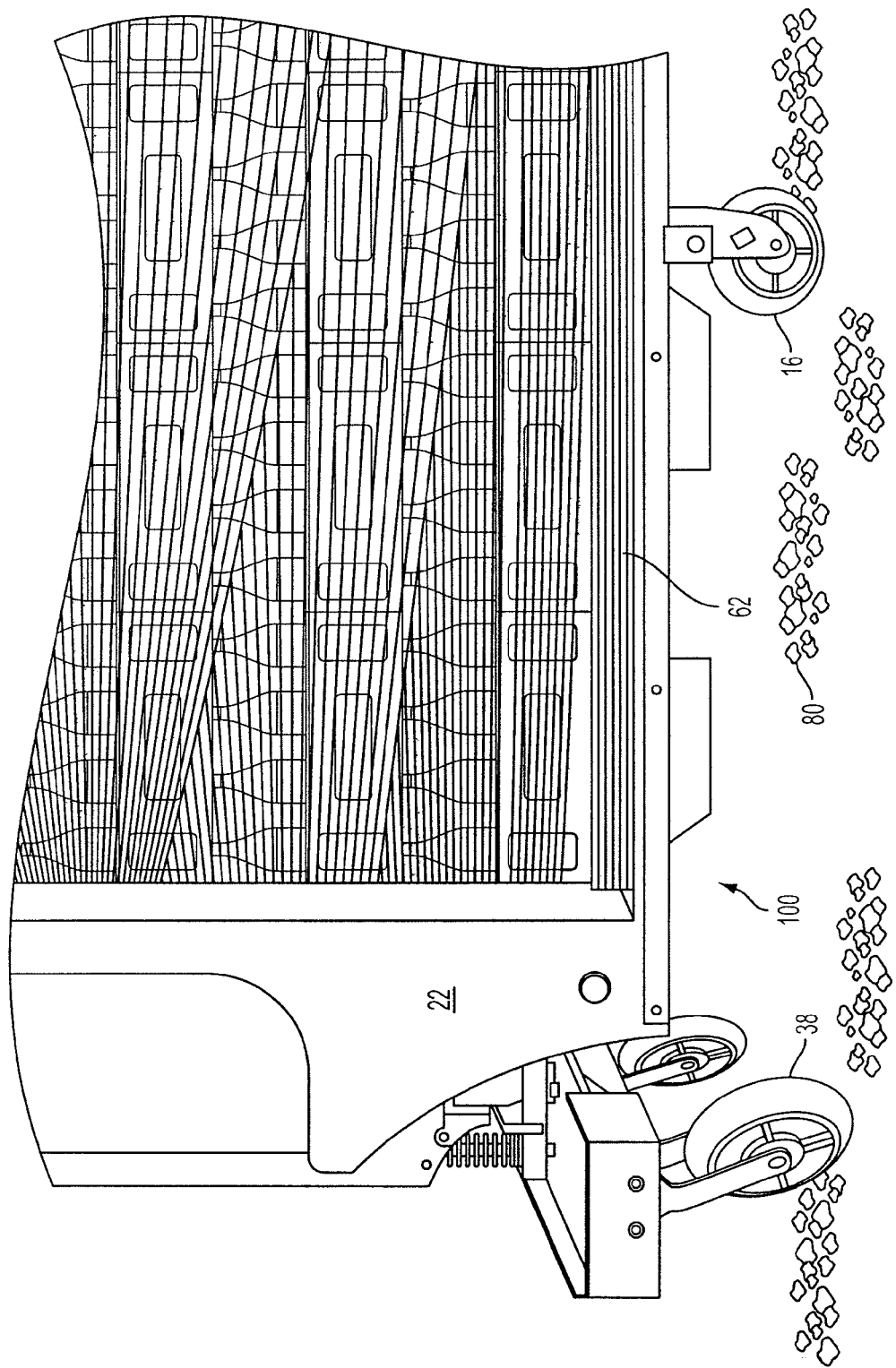
FIG. 30 illustrates the pallet jack shown in FIG. 3 carrying a fully loaded pallet on a gravel covered surface according to an embodiment of the present invention.

Referring to FIGS. 6-9, and 12-16, several additional features of pallet jack 100 according to exemplary embodiments of the present invention shall now be discussed. Located at the rear top or uppermost portion of pallet jack body 22 are left and right semi-circular handle bars (handle bars) 28, 30 and handle bar connector 32. The combination of left and right handle bars 28, 30 and handle bar connector 32 provides the operator with a means for maneuvering pallet jack 100 when fully loaded with pallets 62 that is itself loaded with packaged goods. According to a preferred embodiment of the present invention, packaged goods include a plurality of beverage trays 64 and filled beverage bottles 72 (including bottles 72a-n). A maximum load for pallet jack 100 according to a preferred embodiment of the present invention is about 1500 lbs. Left and right handle bars 28, 30 and handle bar connector 32 provide a place for the operator to grab and manipulate pallet jack 100 over substantially rough and/or uneven terrain, such as in a compacted gravel parking lot, or one in which there are potholes or cracks in the asphalt surface. According to a preferred embodiment of the present invention, gravel in a compacted gravel parking lot includes pieces of rock, wood, asphalt, concrete, and other substantially hard materials that are about 0.5" in diameter. Furthermore, substantially uneven terrain can include dirt parking lots, and paved parking lots with potholes of about 0.5" in width according to a preferred embodiment of the present invention. Referring to FIG. 30, pallet 100 is shown carrying fully loaded pallet 62 on a gravel covered surface 80 according to an embodiment of the present invention. The gravel that is included in the compacted gravel covered surface 80, which is an example of substantially uneven terrain, is about 0.50" in diameter.

As discussed in greater detail below, left and right handle bars 28, 30 and handle bar connector 32 can be used by the operator to manipulate pallet jack 100 up a ramp from the parking lot to the interior of the convenience store. As those of ordinary skill in the art of the present invention can appreciate, the term convenience store is used herein for any type of building, whether it be a warehouse, convenience store, large grocery store, specialty food store, consumer warehouse stores (such as Wal-Mart®, BJs®, Costco®, among others), and among other types of stores and/or facilities.

Figure 27:
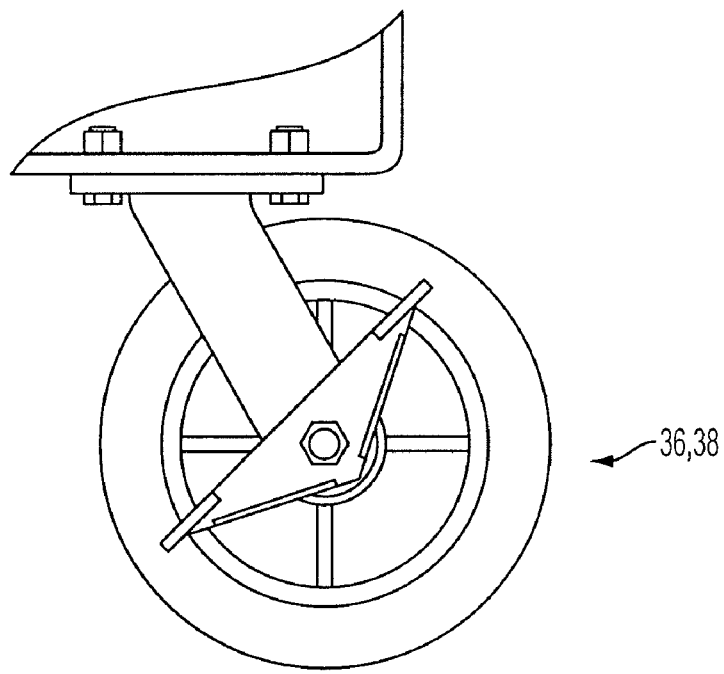
FIG. 27 illustrates a side view of a rear wheel used in the pallet jack shown in FIG. 3 according to an embodiment of the present invention.

FIG. 27 illustrates rear wheel 36, 38. As shown in FIGS. 3, 6-10, and 13-15, left and right rear wheels 36, 38 can be seen to be substantially aligned with the centerlines of left and right tines 2, 4, respectively. By aligning left and right rear wheels 36, 38 with the centerlines of left and right tines 2, 4, pallet jack 100 is now much more stable than if left and right center wheels were located along the centerline of the pallet jack 100, as is done in the prior art. By enhancing the stability of pallet jack 100 through placement of left and right rear wheels 100 along the centerlines of left and right tines 2, 4, respectively, pallet jack 100 can more easily traverse substantially uneven and non-smooth surfaces. For example, many parking lots outside retail and wholesale stores, as well as warehouses, will have compacted gravel surfaces, consisting of gravel that can be as much as 0.5" in diameter. According to a preferred embodiment of the present invention, pallet jack 100 can easily traverse non-smooth and uneven surfaces that consist of gravel that has a diameter of about 0.5".

According to a further embodiment of the present invention, pallet jack 100, because of the enhanced stability provided by placement of left and right rear wheels 36, 38 along the centerlines of left and right tines 2, 4, respectively, enables operators to more easily operate pallet jack 100 to traverse non-smooth and uneven parking lots that consist of asphalt or dirt surfaces that have cracks or potholes in them wherein the cracks and/or potholes have widths of about 0.5".

Figure 13:
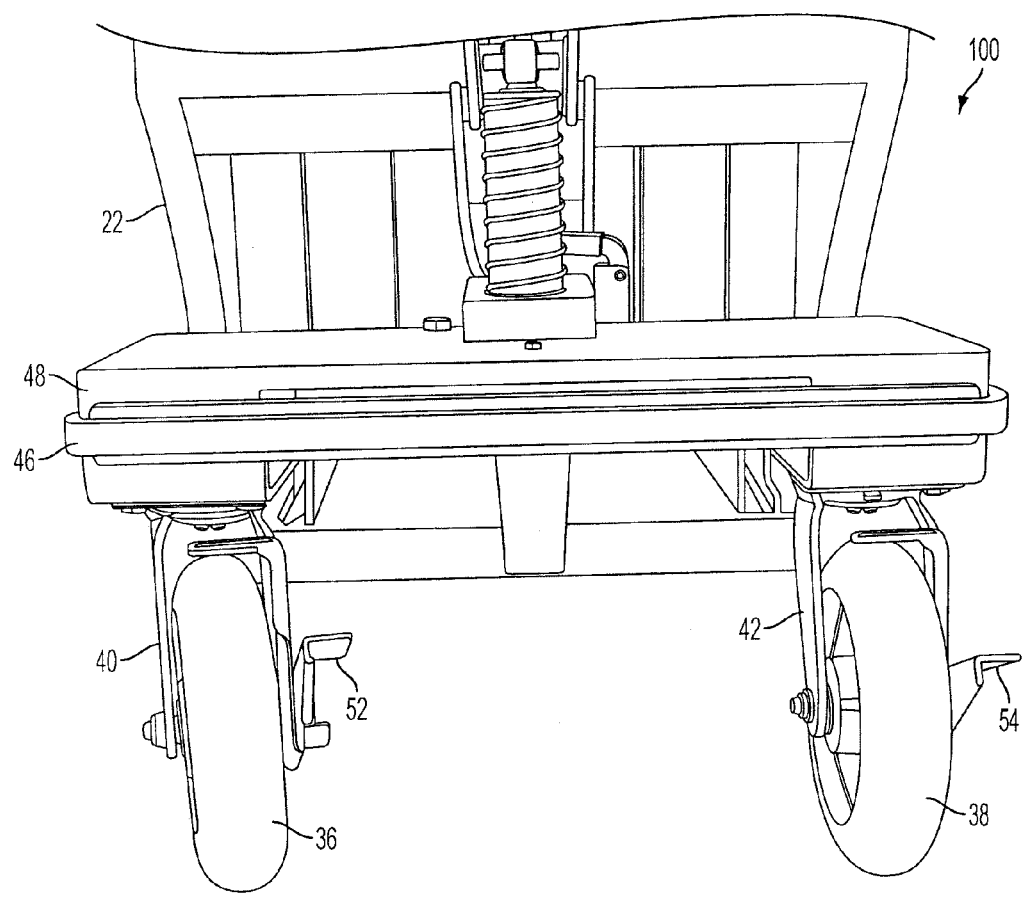
FIG. 13 illustrates a close up of a bumper on the pallet jack shown in FIG. 3 according to an embodiment of the present invention.

Furthermore, as shown in FIG. 13, left and right rear wheels 36, 38 are fixedly attached to rear wheel plate 48 via left and right rear wheel assemblies 40a-c, 42a-b respectively. According to a preferred embodiment of the present invention, left rear wheel 36 is fixedly attached (through left rear wheel assembly 40) to a left outermost portion of rear wheel plate 48, and right rear wheel 38 is fixedly attached (through right rear wheel assembly 42) to a right outermost portion of rear wheel plate 48. Placed at the left and right outermost portions of rear wheel plate 48 respectively, left and right rear wheels 36, 38 are substantially equidistant from the centerline of pallet jack 100, and substantially equidistant from the lifting mechanism assembly 24 (including lift handle 26). The centerline of pallet jack 100 extends from a point equidistant between left and right tines 2, 4 to and through a point directly under lifting mechanism assembly 24 and lift handle 26. Locating left and right rear wheels 36, 38 at substantially equidistant positions from the centerline of pallet jack 100 and lifting mechanism 24, and at the left and right outermost portions of rear wheel plate 48 provides enhanced stability for pallet jack 100, which enables pallet jack 100 to more easily traverse substantially un-smooth and/or uneven surfaces, as discussed above.

Both left and right rear wheels 36, 38, as shown in FIG. 27, among others, rotate about their center axle through 360° of rotation (i.e. a substantially vertical rotation), and through 360° of rotation in a substantially horizontal plane about an imaginary vertical axis. The imaginary vertical axis for both left and right rear wheels 36, 38 is substantially perpendicular to rear wheel plate 48 at the point where each of left and right rear wheels 36, 38 are fixedly attached to rear wheel plate 48. Furthermore, each of left and right rear wheel include locks 52, 54 that can be operated by an operator's foot. Locks 52, 54 can fix pallet jack 100 in place so that it does not roll away from an operator while unattended or at other times.

According to exemplary embodiments of the present invention, pallet jack 100 exhibits substantial stability in lifting and transporting pallets 62 because of the aforementioned features of the aspect ratios of front wheels 14, 16, and the aspect ratios of rear wheels 36, 38, as well as the location of the rear wheels 36, 38 along the centerlines of left and right tines 2, 4, and the locations of rear wheels 36, 38 at the outermost portions of rear wheel plate 48, as discussed in detail above, among other reasons. Accordingly, pallet jack 100 can lift and transport pallets 62 that have varying length-to-width ratios, wherein the length of the pallet is defined as being the dimension substantially parallel to the direction of left and right tines 2, 4, and the width dimension as being substantially orthogonal to the length dimension. Pallet jack 100 can lift and transport pallets 62 with substantial ease and stability even if pallets 62 have length-to-width ratios of 2:1, 3:1 or more. According to a preferred embodiment of the present invention, pallet jack 100 can lift and transport pallet 62 with dimensions of about 18" wide, 47.5" long, and 8.5" high, for a length-to-width ratio of about 2.64. Pallets according to the prior art generally have a length-to-width ratio of about 1.0.

Figure 14:
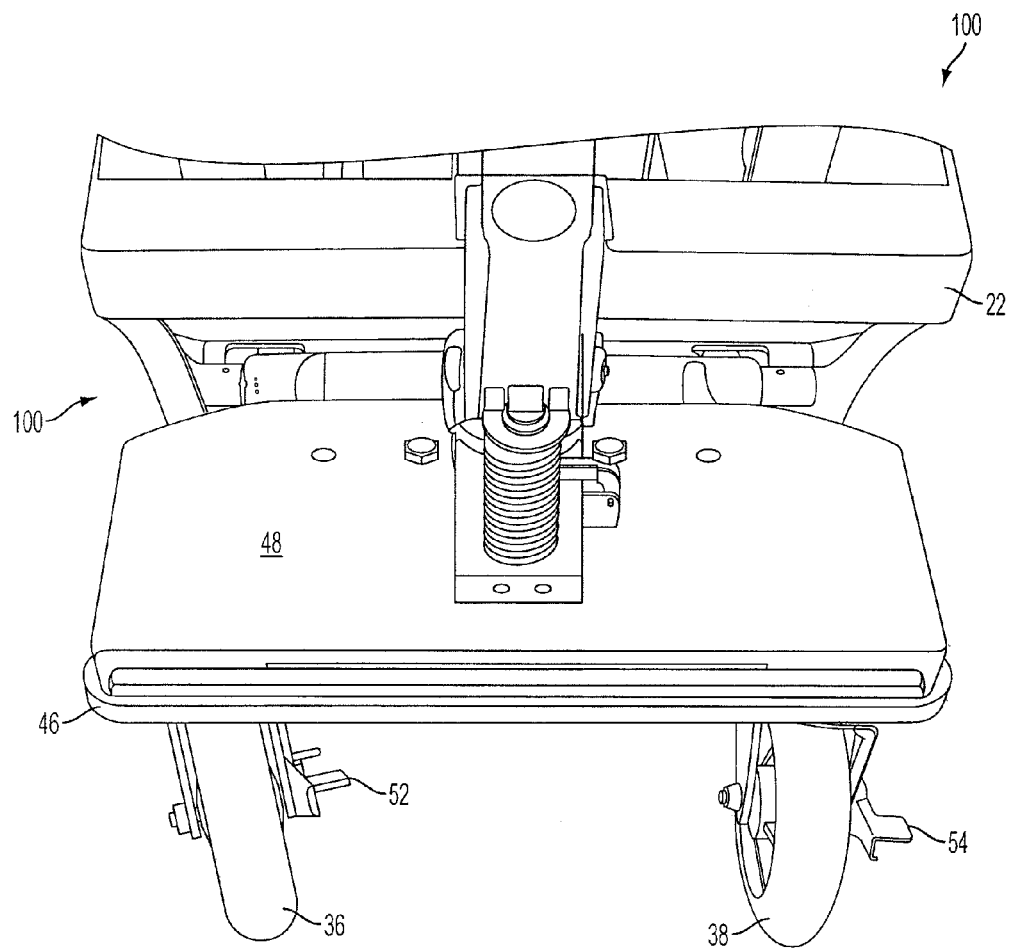
FIG. 14 illustrates an upper isometric view of the bumper on the pallet jack as shown in FIG. 13.
Figure 15:
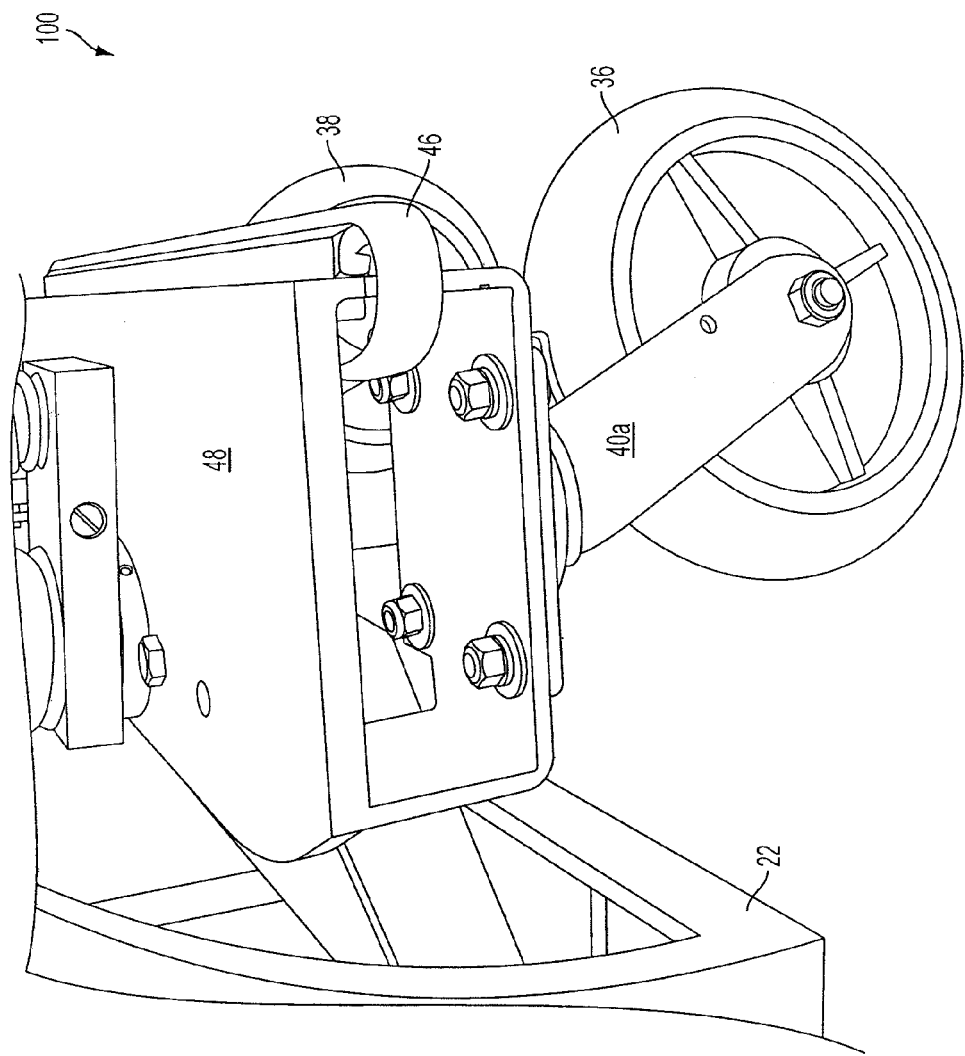
FIG. 15 illustrates a left side view of the bumper on the pallet jack as shown in FIG. 13.

Referring to FIGS. 3, and 7-10, a first embodiment of rear bumper 46 is shown. Rear bumper 46 protects pallet jack 100 from damage due to inadvertent collisions with delivery vehicles and doors, and things of that nature. Further, rear bumper 46 protects goods, displays and other items inside stores, warehouses and other locations wherein pallet jack 100 is used to deliver pallets loaded with product. Rear bumper 46, similarly to left and right tine bumpers 10, 12, according to a first embodiment, is preferably made of stainless steel or polished aluminum plate that is about 0.125" thick. As those of ordinary skill in the art can appreciate, rear bumper 46 can also be made of several different materials, such as plastic and rubber and still function equally well. FIGS. 13-15 illustrates rear bumper 46 according to a second embodiment that is made of ultra high molecular weight rubber that is semi-circular in cross section, with a radius of about 0.5". Rear bumper 46 provides the same protection to pallet jack 100 and goods, displays and other items as does rear bumper 46. As those of ordinary skill in the art can appreciate, rear bumper 46 can be made of several different materials, such as plastic and rubber, and still function equally well.

Figure 29:
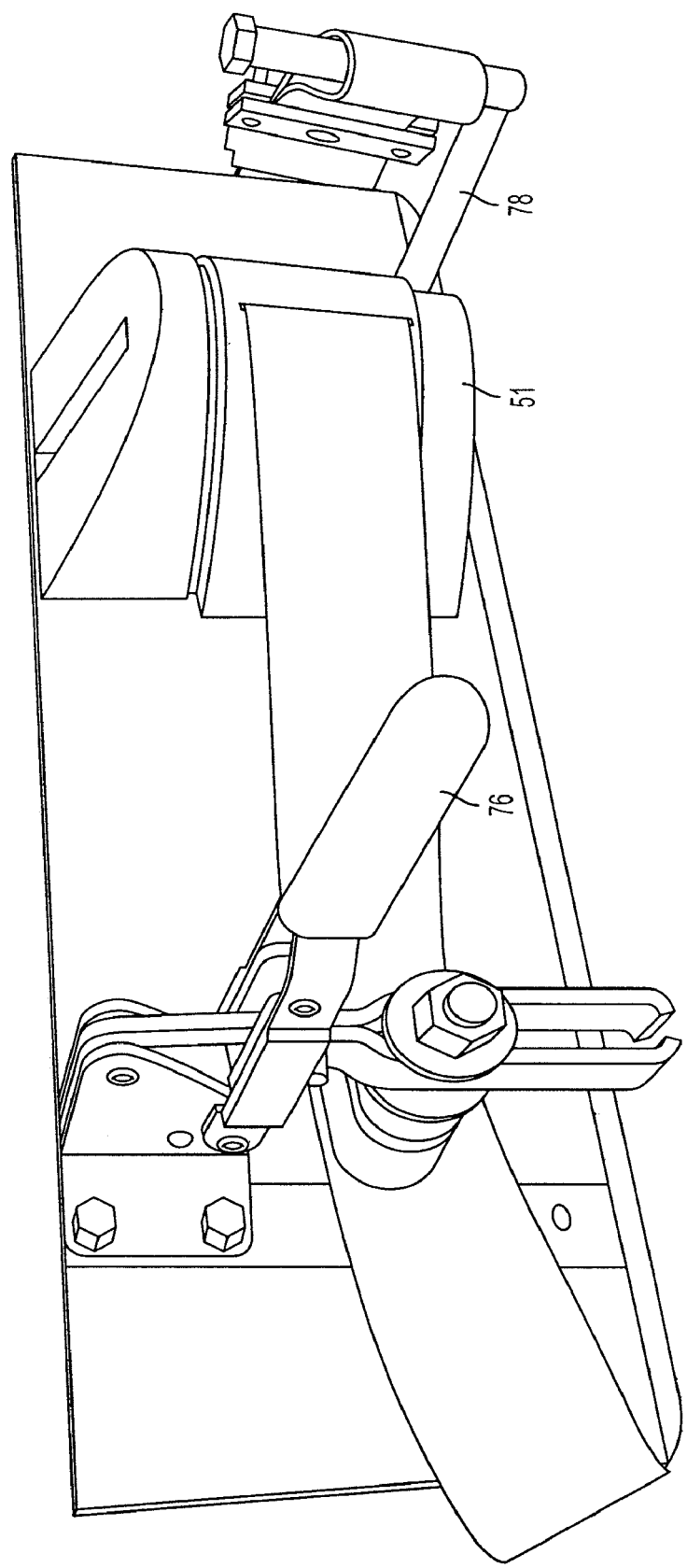
FIG. 29 illustrates an alternative strap for use with the pallet jack shown in FIG. 3 according to an embodiment of the present invention.

Referring to FIGS. 3, and 7-11, a first embodiment of strap 50 is shown. Straps 50a, b (left and right sides) enable an operator to even more securely retain a loaded pallet 62 to pallet jack 100 when loaded onto and moved by pallet jack 100. Straps 50a, b are configured to operate similarly to seat belts in that they buckle together and can be tightened to secure loaded pallet 62 to pallet jack 100. Accordingly, strap 50a includes a receptacle, and strap 50b includes a buckle plug (or visa-versa). According to another embodiment of the present invention, straps 50a, b can be replaced with straps 51a, b that are retractable into a strap storage container (See FIG. 29). Straps 51a, b can also have a buckle receptacle and buckle jack, and can be tightened similarly to straps 50a, b. Alternatively, as shown in FIG. 29, strap 51 comprises a single length of retractable belt that has a loop at the extendable end that can be located on a strap post 78 as shown in FIG. 29. For security, clamp 76 is added to retain strap 51 in a fixed length condition, thereby securing loaded pallet 62 to pallet jack 100.

Since strap 51 is retractable, they do not need to be tied up to pallet jack body 20 thereby saving trouble and effort on the part of the operator of pallet jack 100. Furthermore, because straps 51a, b are retractable, there is also a substantially reduced likelihood of them damaging goods, displays, doors and other apparatus when pallet jack is in a retail, commercial, warehouse, or wholesale location.

Figure 12:
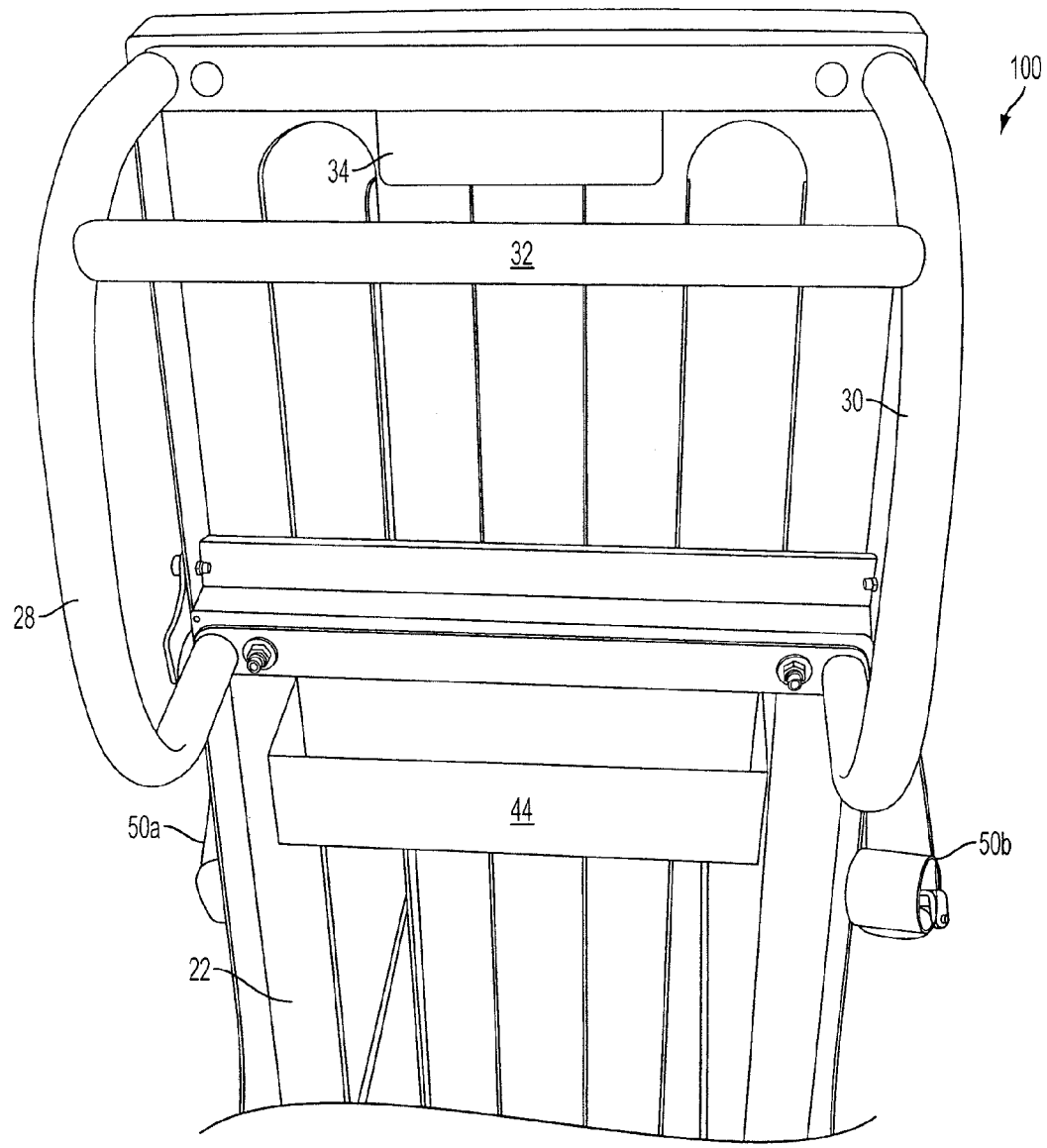
FIG. 12 illustrates a close up of a semi-circular handle on the pallet jack shown in FIG. 3 according to an embodiment of the present invention.

Pallet jack 100 has been further provided with additional features that enhances its usefulness. Referring to FIG. 12, basket 44 is shown, located on a rear portion of pallet jack body 22. Basket 44 can be used to hold shipping/delivery orders, lists, writing instruments, keys, and other personal effects. Basket 44 provides pallet jack 100 with a feature that operators will find useful when delivering goods.

Figure 16:
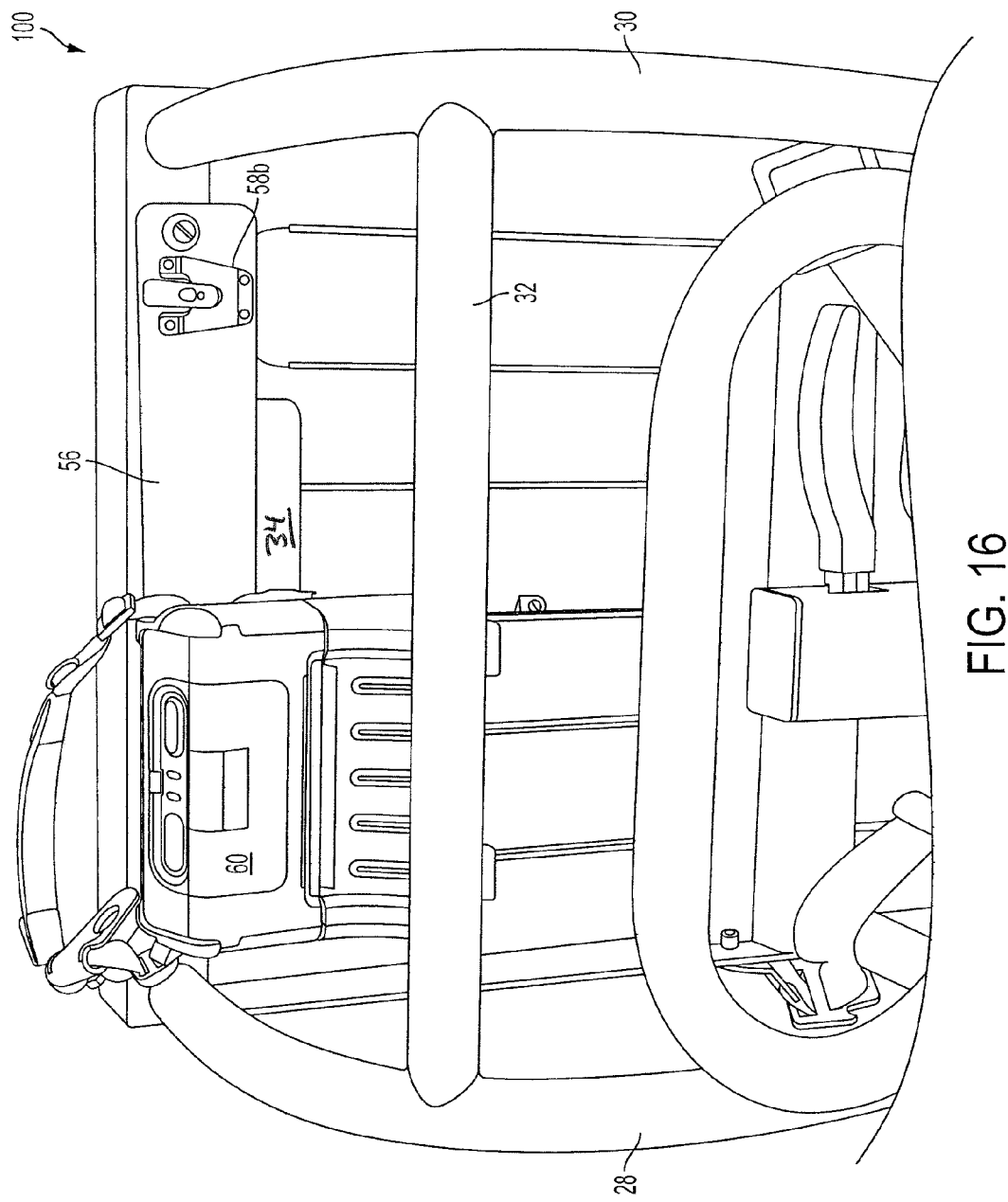
FIG. 16 illustrates a close up rear view of the pallet jack and semi-circular handles with an electronic device holder according to an embodiment of the present invention.

Shown in FIG. 16 is electronic device holder plate 34 and/or 56, electronic device holder jack (jack) 58b, and electronic sales delivery/order/tracker device (hand held device) 60. As well known to those of ordinary skill in the art of the present invention, operators of pallet jack 100 will typically use hand held device 60 when delivering products with pallet jack 100 and pallets 62. These devices have become standard issue to large commercial enterprises that routinely deliver large amounts of products to final and/or intermediate customers. Well known examples include the world-wide tracking systems of FedEx®, UPS®, DHL®, among others. In those situations, the "product" delivered are packages, envelopes, and whatever else can be shipped. Although it varies from delivery to delivery, the concept is the same: track the shipping of a product, from the point in time when it was deposited at an associated facility, to when the product is delivered. Furthermore, if is known from the customer that other products will be ready to be shipped at certain times, pick-ups of those products can be scheduled using hand held device 60.

Similarly, hand held device 60 is used by operators of pallet jack 100 when delivering product to update a database that the product has been delivered, and can take additional orders (especially if from a retail convenience type store) if necessary. Hand held device 60 stores the information, and can transmit it back to a central repository using RF communications in real time, similar to a cell phone. Since operators of pallet jacks 100 will typically use hand held device 60, pallet jack 100 has been designed to incorporate plate 56 that is attached to a rear upper portion of pallet jack body 22, to which are attached jacks 58*a, b*, that can be used to secure or retain hand held devices 60. Hand held device 60 will have a plug that mates with jack 58*a, b* to securely retain it to pallet jack 100.

E. Method of Using Pallet Jack 100 and Pallet 62

According to a further exemplary embodiment of the present invention, the various inventive features described herein provide for an efficient and effective means for transporting pallets 62 loaded with packaged goods 74, preferably beverage trays 64 and beverage bottles 72, from a delivery vehicle to a retail location for display and purchase by consumers. Although the method according to a preferred embodiment of the present invention has been described in reference to delivery of beverage trays and bottles, such discussion should not be construed as limiting the scope of the embodiments of the present invention. As discussed in detail above, pallet jack 100 and pallet 62 can be used to delivery virtually any type of consumer product to virtually any type of location, and even raw materials for use in manufacturing. Further still, although the method describes delivery of beverage products to a convenience retail store, as discussed above, it should be understood by those of ordinary skill in the art of the present invention that delivery can be made to nearly any type of location, including, for example, warehouses, large grocery stores, manufacturing facilities, homes, among other types of locations.

Figure 17:
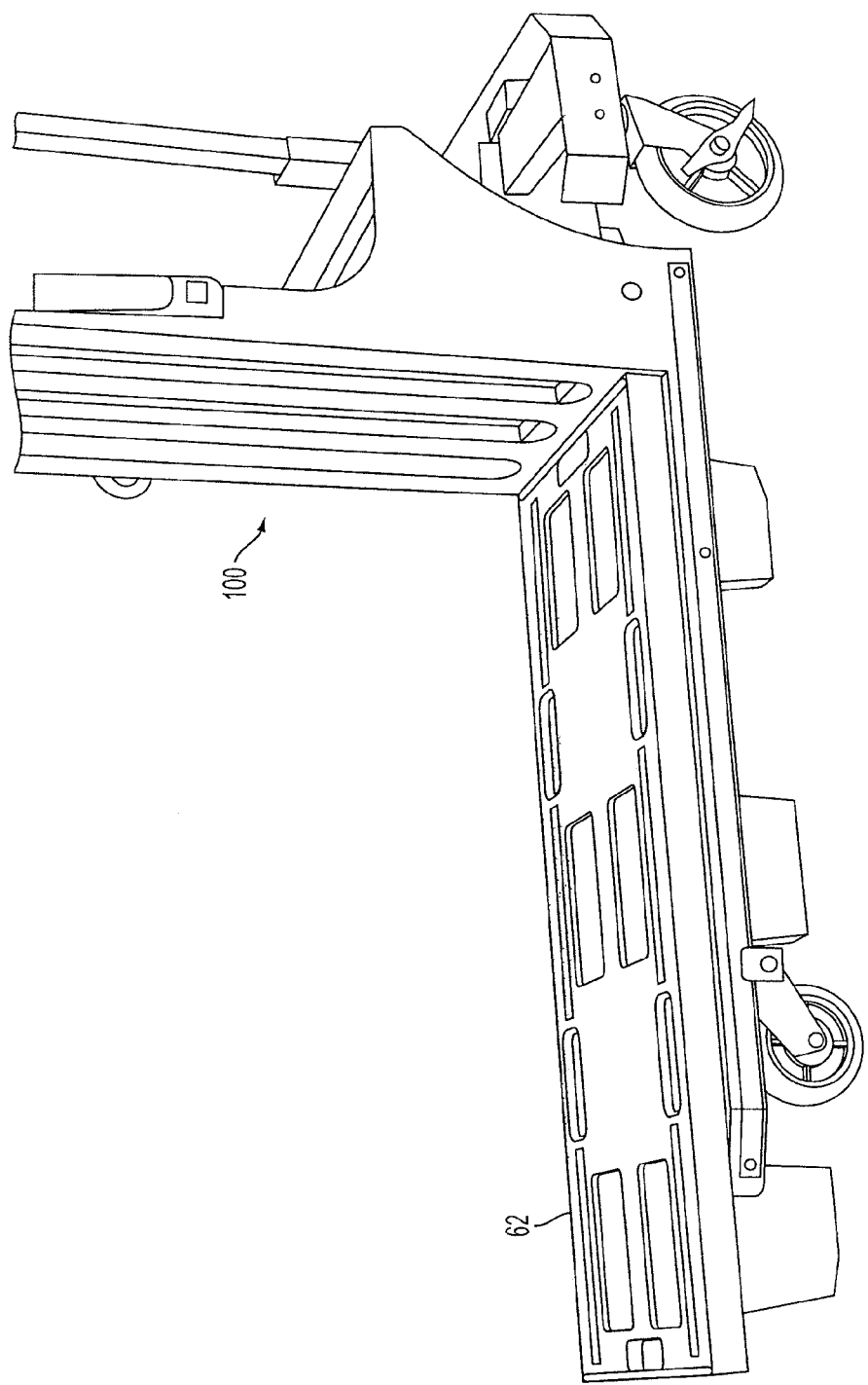
FIG. 17 illustrates the pallet jack of FIG. 3 with an empty pallet according to an embodiment of the present invention.
Figure 18:
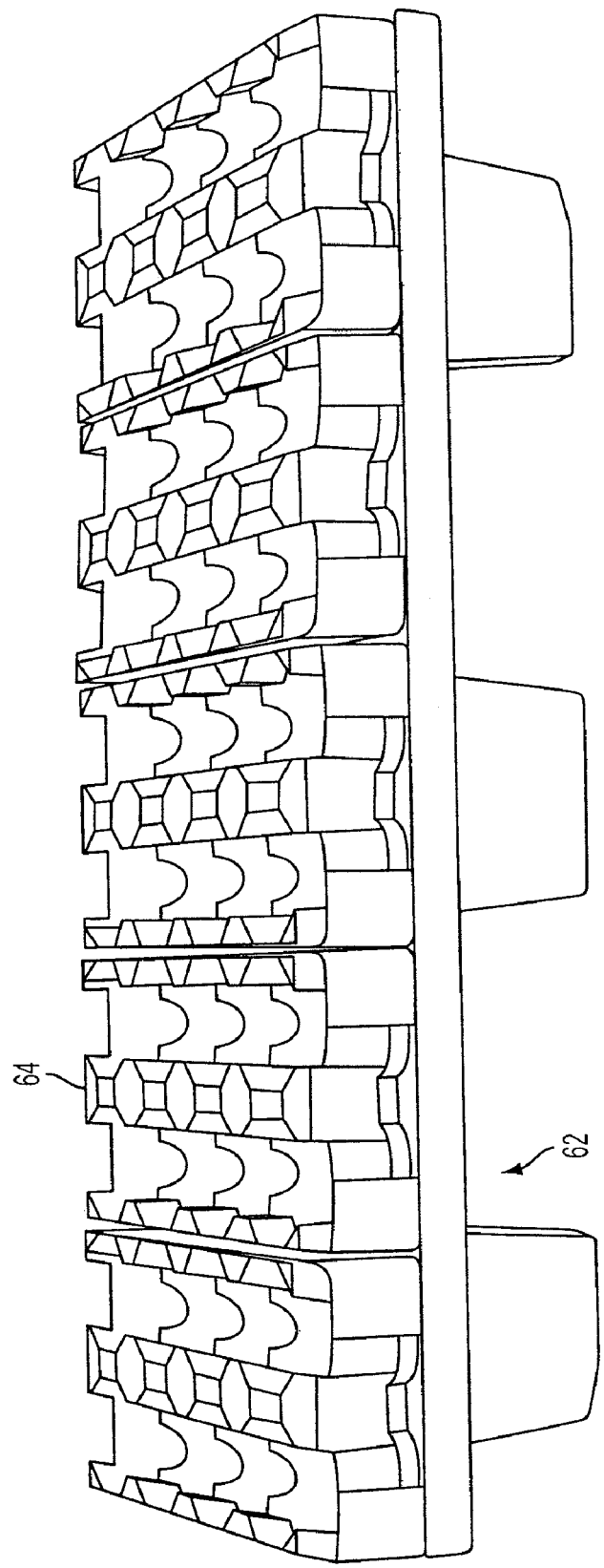
FIG. 18 illustrates a pallet for use with the pallet jack as shown in FIG. 3 according to an embodiment of the present invention, wherein the pallet is loaded with a row of empty beverage trays.
Figure 19:
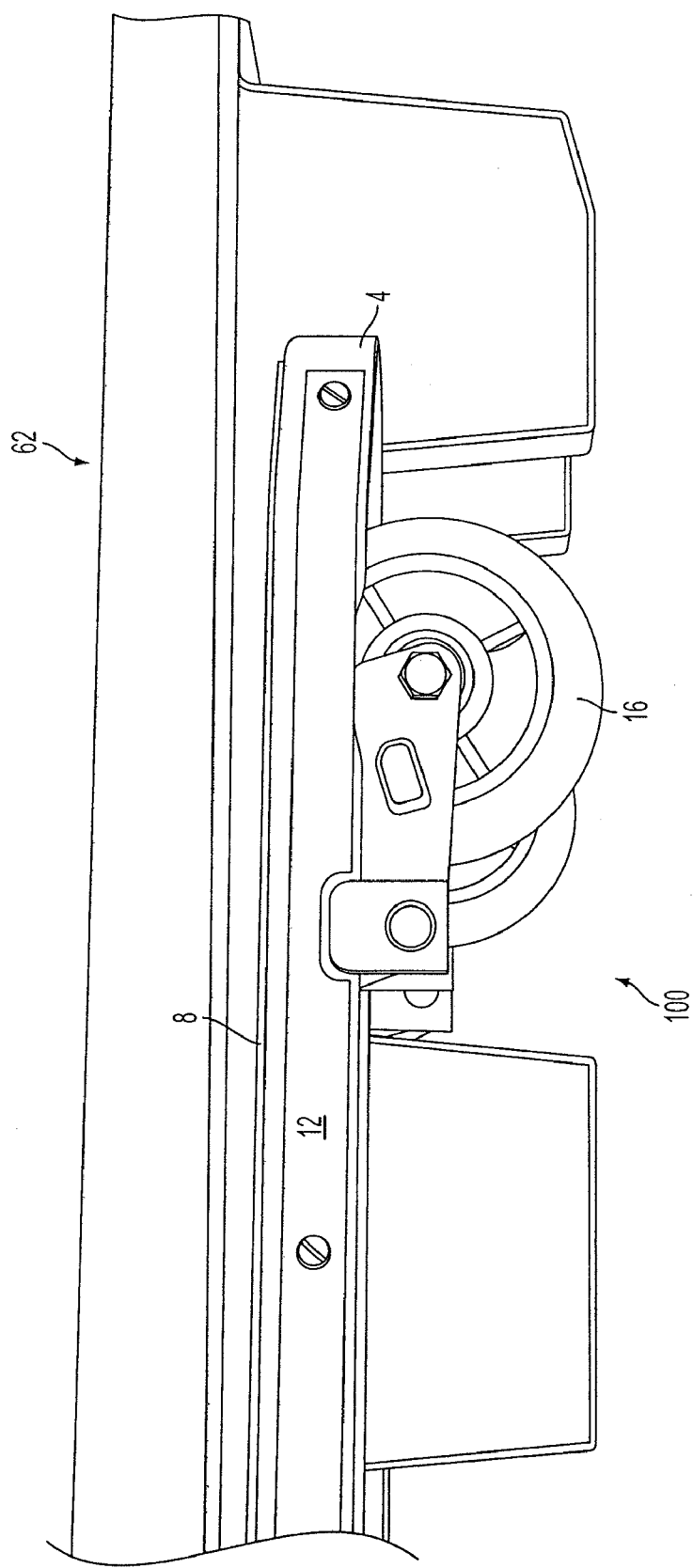
FIG. 19 illustrates a close up right side view of the pallet jack shown in FIG. 3 engaging the pallet shown in FIG. 18 according to an embodiment of the present invention.
Figure 20:
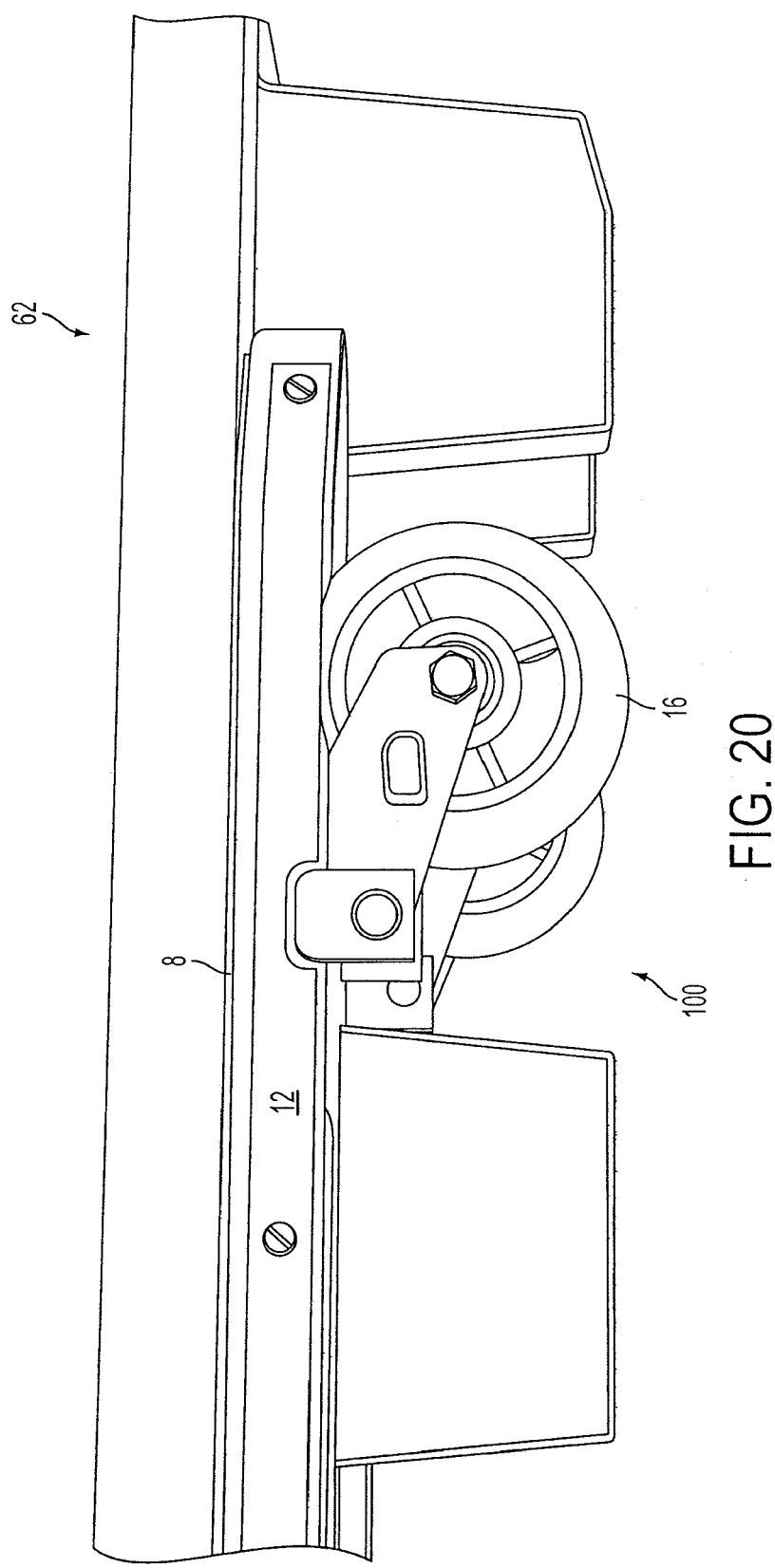
FIG. 20 illustrates a close up right side view of the pallet jack shown in FIG. 3 further engaging the pallet shown in FIG. 18 according to an embodiment of the present invention.
Figure 21:
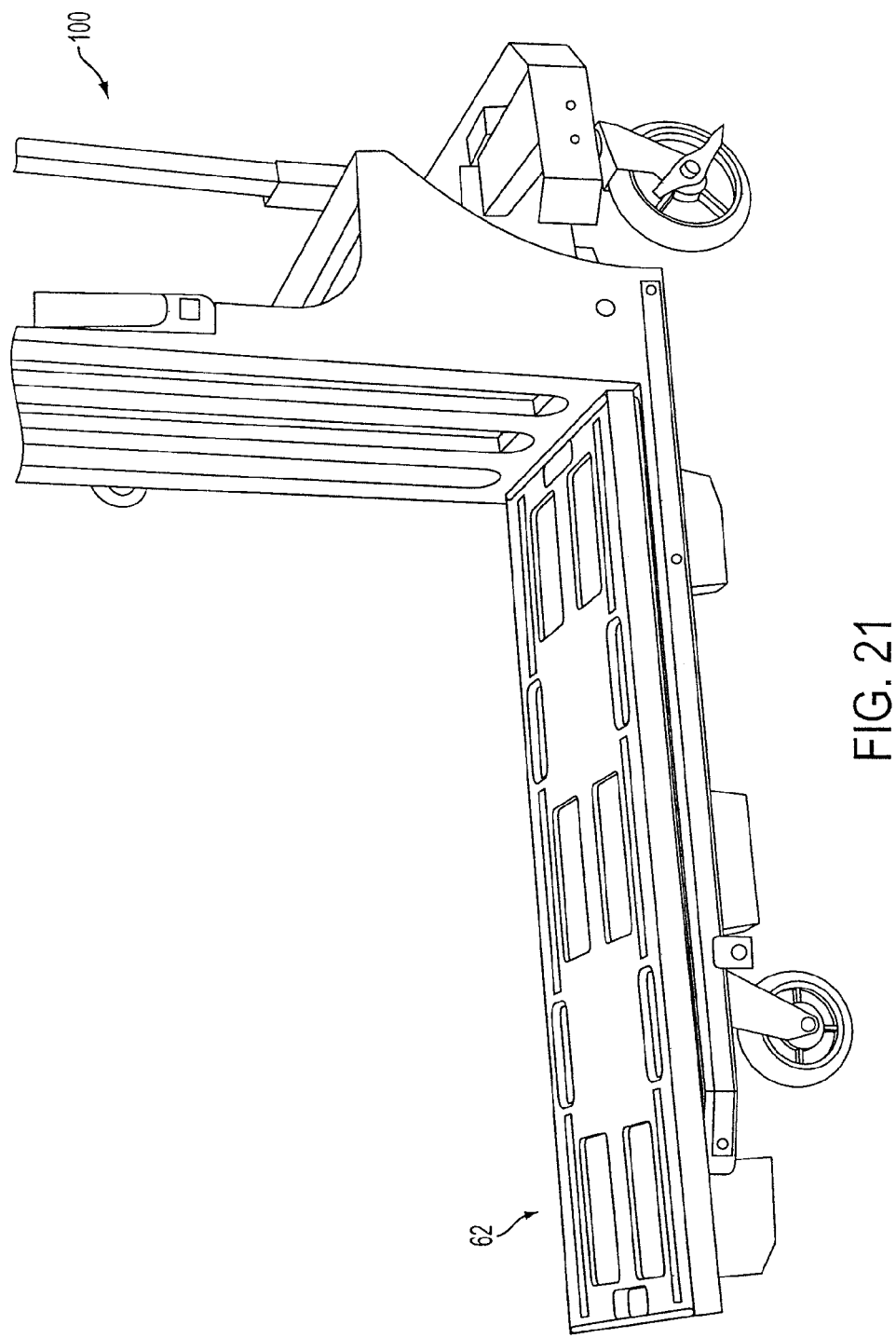
FIG. 21 illustrates the pallet jack of FIG. 3 with a loaded pallet according to an embodiment of the present invention.

According to an exemplary embodiment of the present invention, the method for transporting beverage trays 64 loaded onto pallet 62 from a delivery vehicle to a retail location begins with the loading of beverage trays 64 onto pallet 62 (see, for example, FIGS. 17 and 18). According to an exemplary embodiment of the present invention, pallets 62 are usually filled with beverage bottles 72 at a central warehouse or shipping distribution center (and covered with plastic film (i.e., "shrink-wrapped)), although it may be the case that pallets 62 can also be loaded with beverage bottles 72 directly from the delivery vehicle. Once pallets 62 are loaded with beverage trays 64 that are filled with beverage bottles 72, pallet jack 100 with left and right tines 2, 4 are placed adjacent to and alongside an outer portion of each of the plurality of stacking feet of pallet 62 (see FIG. 19). Left and right tines 2, 4 are then raised by lifting mechanism assembly 24 until loaded pallet 62 rests upon left and right tines 2, 4 (see FIG. 20). The operator of pallet jack 100 continues to lift left and right tines 2, 4 until pallet 62 is lifted an appropriate height $h_2$ above first surface 66 that pallet jack 100 and pallet 62 are resting on (see FIG. 21). Loaded pallet 62 needs only be lifted to a height $h_2$ that, according to an exemplary embodiment of the present invention, is about 3½". Further, because loaded pallet 62 is only lifted to height $h_2$, and not a significantly greater height, straps 50*a, b* or 51*a, b*, that are typically used to retain pallets 62 loaded with beverage bottles 72 to pallet jack 100 need not necessarily be used. As discussed above, if first surface 66 is unusually bumpy, rough, or uneven, it may be necessary to use straps 50*a, b* (or 51*a, b*, as the case may be), for safe and efficient delivery of the product on pallets 62.

Figure 22:
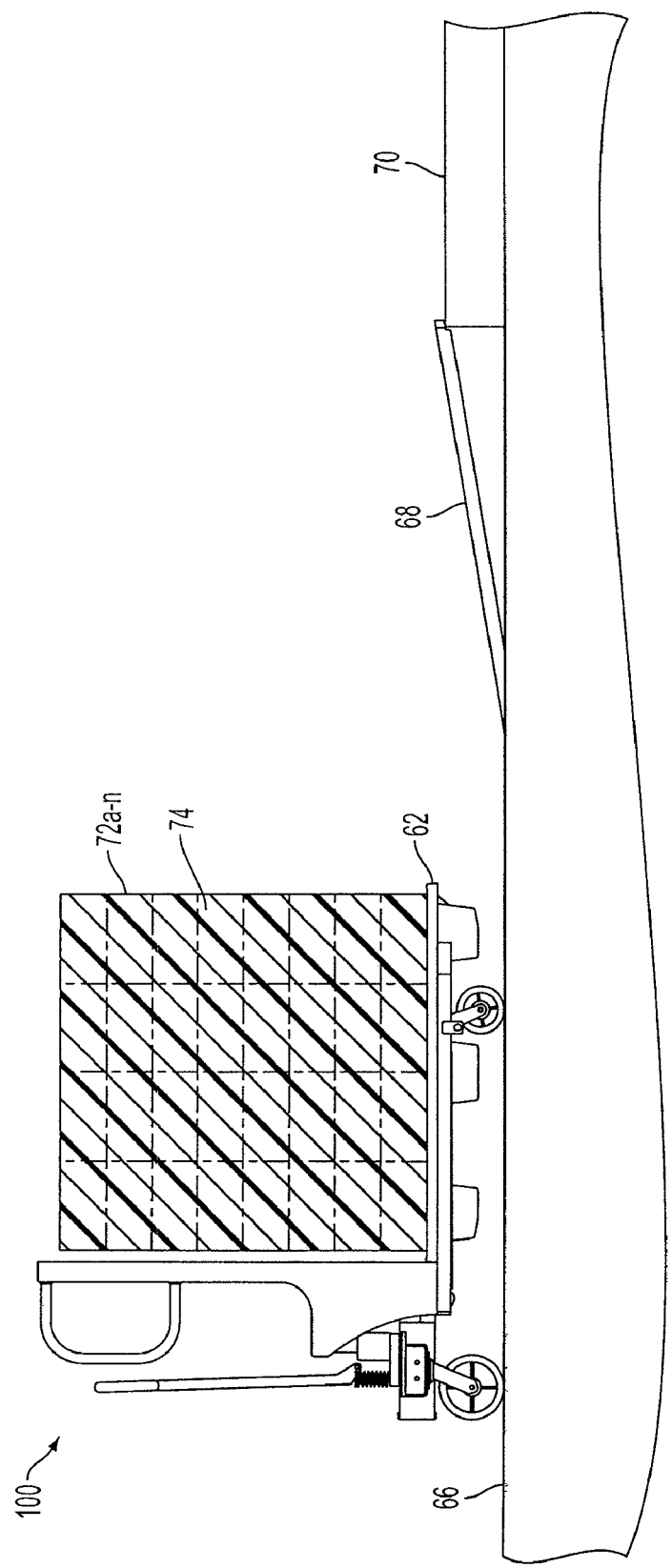
FIG. 22 illustrates a loaded pallet on the pallet jack shown in FIG. 3 approaching a ramp according to an embodiment of the present invention.
Figure 23:
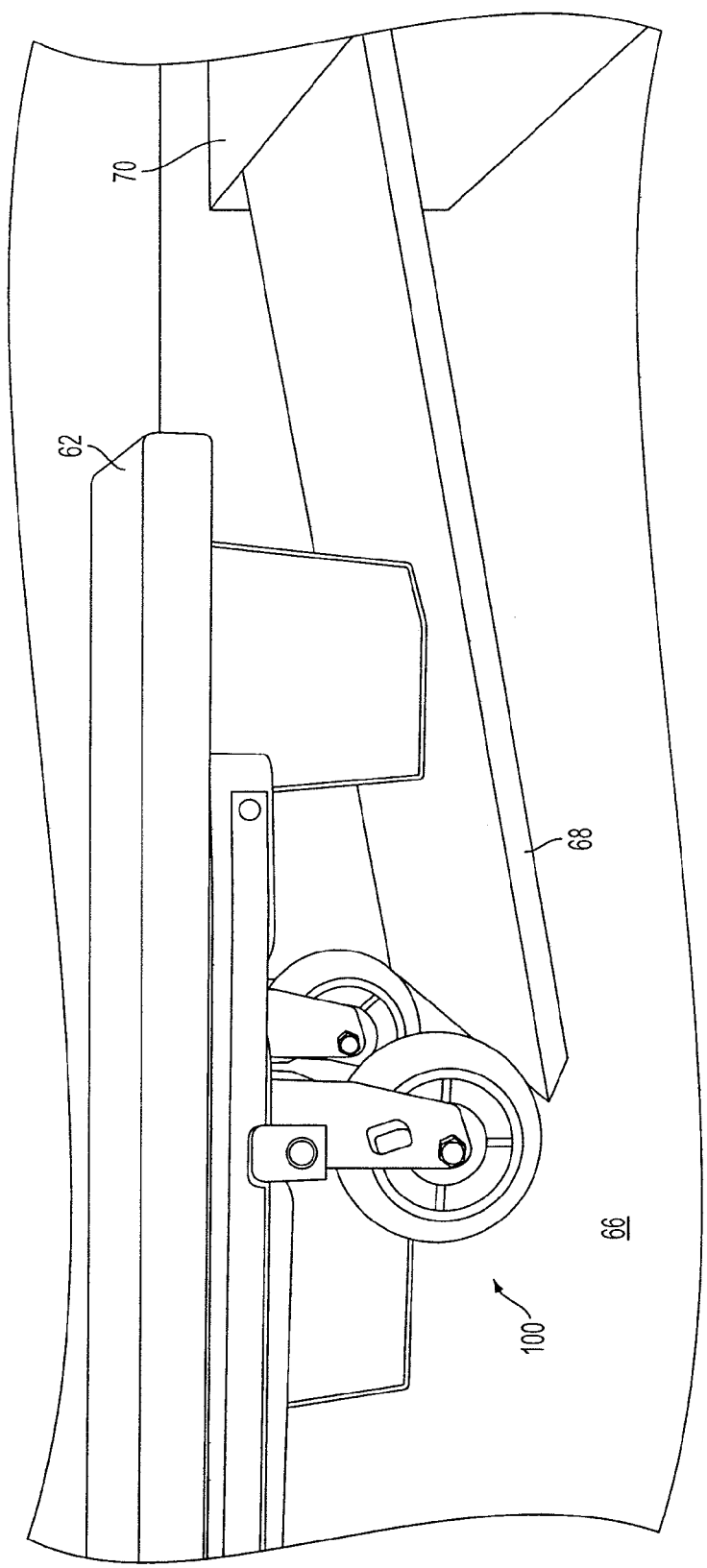
FIG. 23 illustrates a close-up right side view of the pallet jack and ramp shown in FIG. 22.
Figure 24:
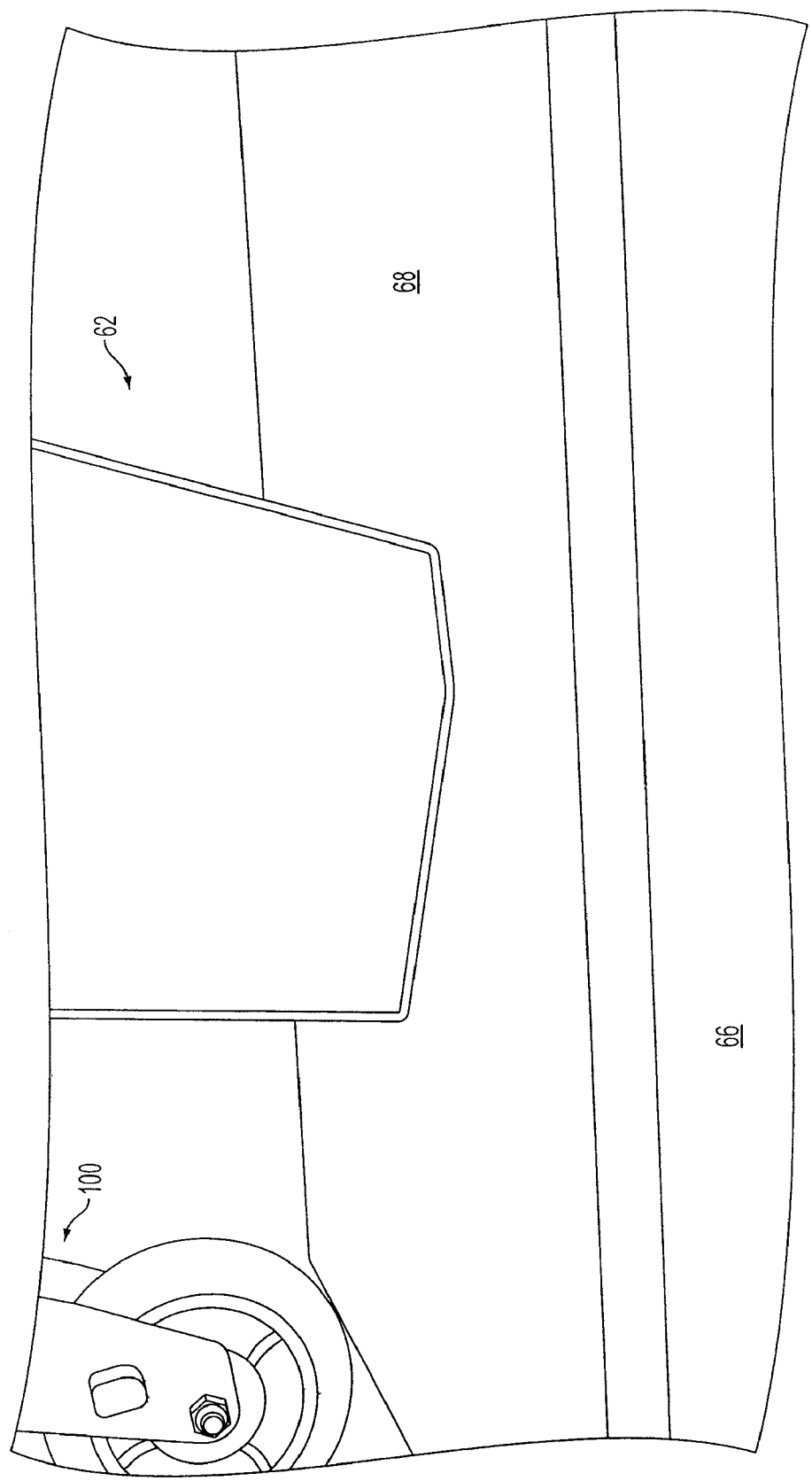
FIG. 24 illustrates a close-up view of a right front stacking foot of a pallet loaded onto the pallet jack shown in FIG. 3 as the pallet jack begins to traverse the ramp shown in FIG. 22 according to an embodiment of the present invention.
Figure 25:
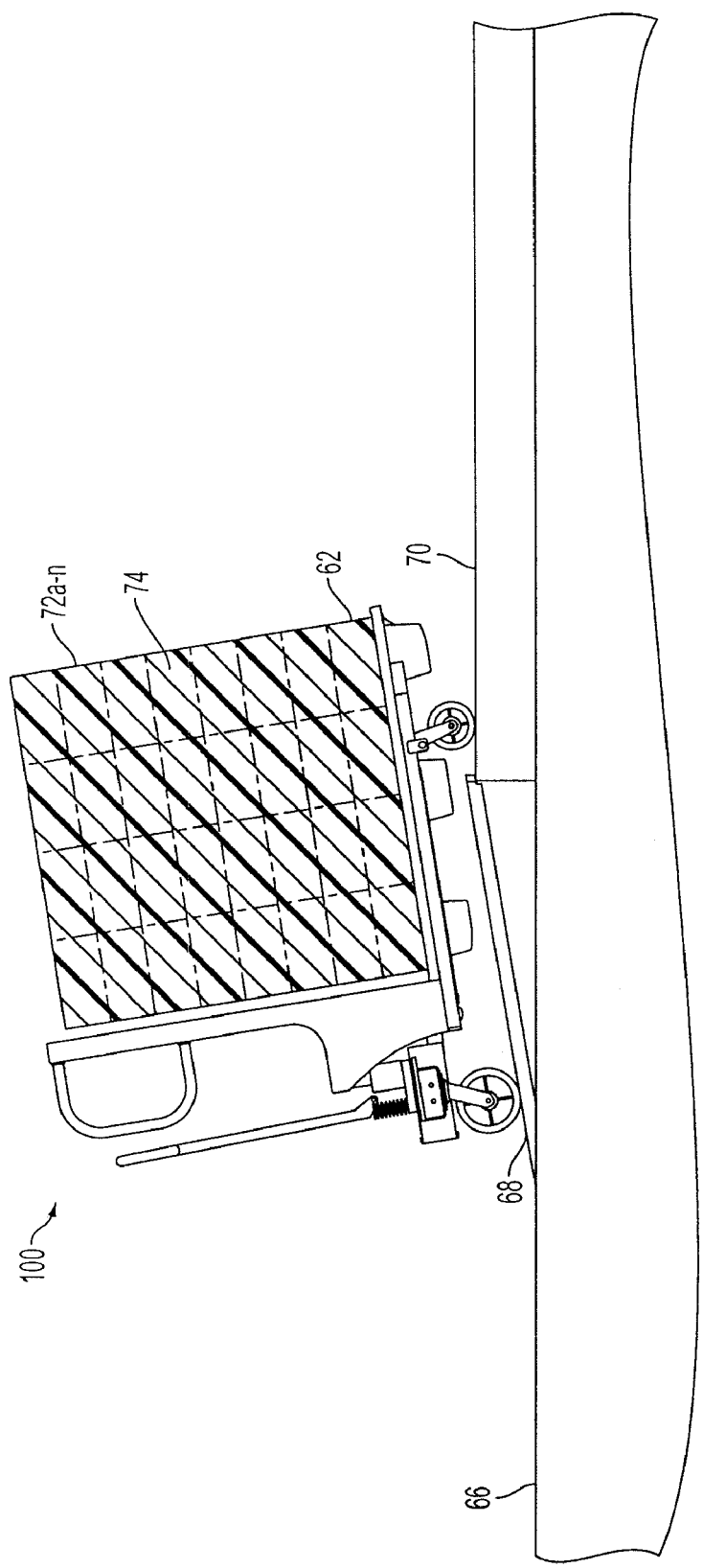
FIG. 25 illustrates a right side view of the pallet, pallet jack and ramp shown in FIG. 19 as the pallet and pallet jack traverse the ramp according to an embodiment of the present invention.

Lifting mechanism then transports loaded pallet 100 from first surface 66 to second surface 70 using ramp 68 (see FIGS. 22-25). During the transporting of loaded pallet 62, pallet 62 traverses ramp 68 inclined at a first angle α from first surface 66 to second surface 70 without substantial impedance as a result of angled surfaces on outer stacking feet of pallet 62 (FIGS. 23 and 24). Following passage of loaded pallet 62 up ramp 68 to second surface 70 (FIG. 25), the operator of pallet jack 100 and pallet 62 places loaded pallet 62 into a preferred location in the retail store. Then, the operator lowers loaded pallet 62 into place, removes pallet jack 100 and its left and right tines 2, 4 from under loaded pallet 62, leaving it in place. Consumers can then purchase beverage bottles 72. According to a further exemplary embodiment of the present invention, the method further comprises wrapping loaded pallet 62 with a shrink wrap material, which substantially prevents displacement of beverage containers during shipment of the same (especially if previously loaded onto pallet 62 at a distribution center), and the operator or retail store owner must then remove the shrink wrap material prior to purchase by consumers.

Generally, it will be the case, as shown in the accompanying and just described FIGS. 22-25, that first surface 66 is lower relative to second surface 70 (see FIG. 22, among others). That is, an operator will transit ramp 68 from the lower parking lot first surface 66 to the higher (relative to first surface 66) curb second surface 70. But that will not always be the case. It should be therefore understood by those of ordinary skill in the art of the present invention that angled surfaces on the stacking feet work equally as well as described above if pallet 62 transits ramp 68 from a higher to lower surface. As long as the same approximate dimensions and configurations are observed, in the case when transiting ramp 68 from a higher first surface 66 to a lower second surface 70, pallet jack 100 and pallet 62 will enable the operator to transit ramp 68 with little or no difficulty.

Described herein is pallet jack 100 that, according to an exemplary embodiment of the present invention, can easily and safely deliver packaged goods loaded onto a pallet 62 from a delivery vehicle to a location inside a building or facility, or substantially uneven or rough terrain. When inside the building or facility, pallet jack 100 substantially eliminates the possibility of scuffing or scraping floors, or goods, or displays that may be located inside the building or facility. The placement and configuration of left and right rear wheels 36, 38, the configuration of left and right front wheels 14, 16, as well as use of handles bars 28, 30 enable pallet jack 100 to provide the ability to navigate substantially rough terrain and uneven surfaces. Other features that include jacks 58*a, b* and basket 44 provide useful features that operators will find convenient. These and other inventive features have been described in detail above according to several exemplary embodiments of the present invention.

According to an exemplary embodiment of the present invention, improved pallet jacks (hereinafter "pallet jack") 200, 300, as shown in accompanying FIGS. 31-37, comprises several unique features. Pallet jacks 200 and 300, as shown and discussed in regard to FIGS. 31-37, incorporates substantially all the same features and improvements over the prior art as discussed in regard to pallet jack 100. For example, pallet jack 200 and pallet jack 300 includes, among other features, the following features that were discussed in detail with pallet jack 100: pallet jack body, left and right guard portions, retractable and non-retractable strap, locking wheels, substantially horizontal plate, lifting mechanism, substantially vertical backing portion, aspect ratio of the wheels, rear guard portion, left and right side handle and bar, pallet jack identification tag, and structure for carrying a hand-holdable device (including a tray and plug). A detailed discussion of all the features and improvements in regard to pallet jack 100, as shown in FIGS. 1-30, have been omitted in the discussion of pallet jack 200 and pallet jack 300 for purposes of brevity and clarity.

Figure 31:
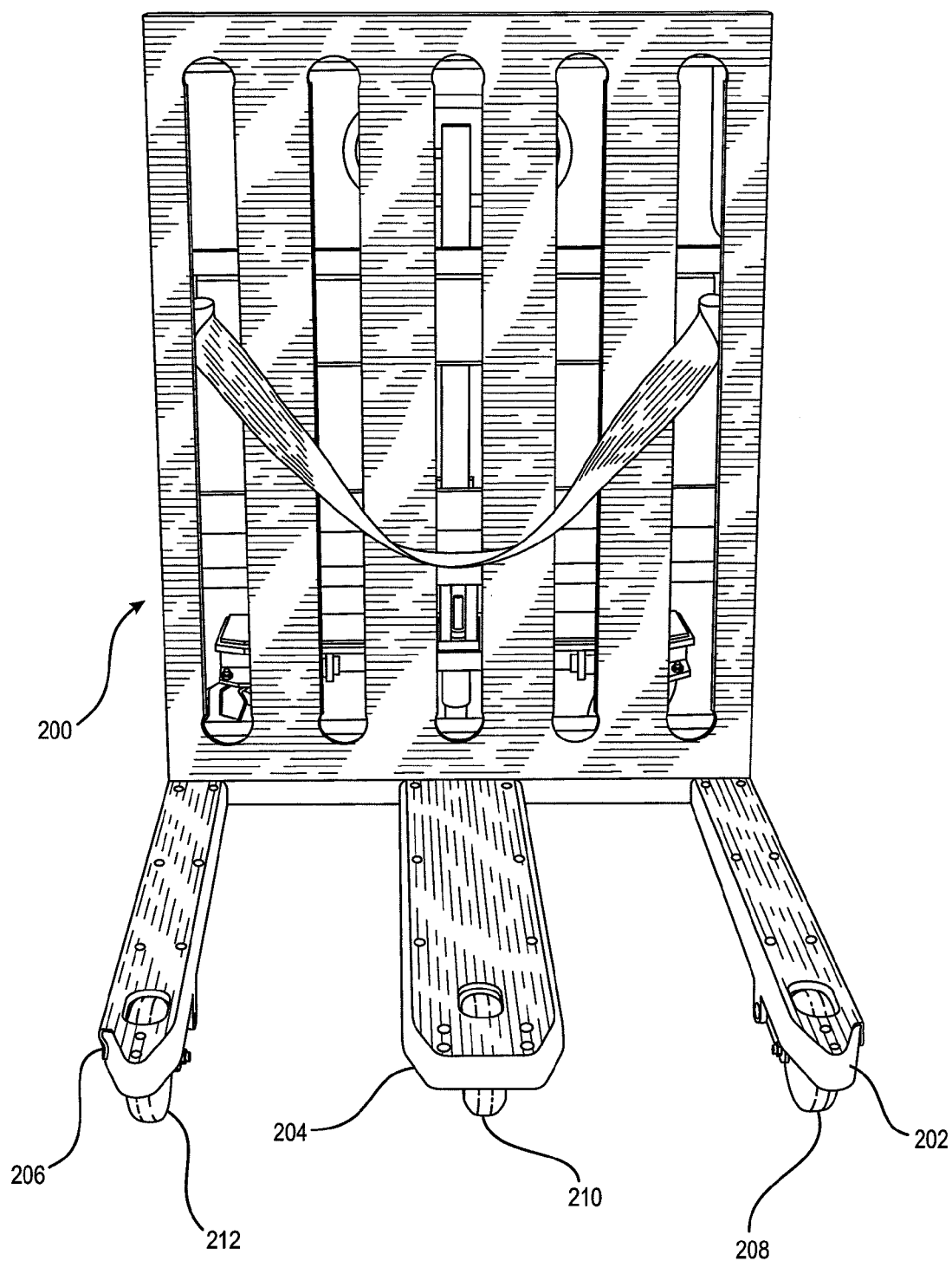
FIG. 31 illustrates a front perspective view of a pallet jack according to an alternate embodiment of the present invention.
Figure 32:
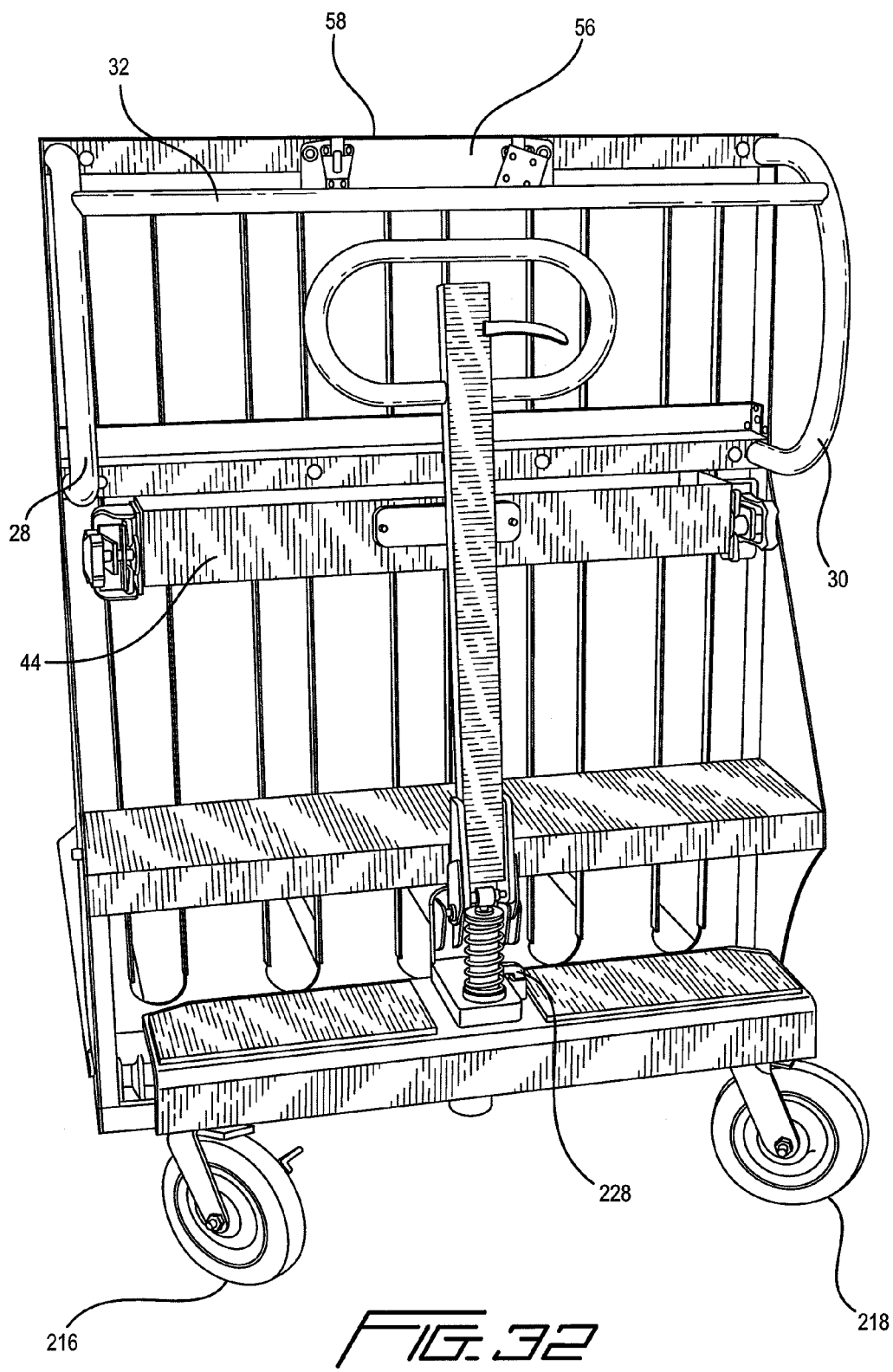
FIG. 32 illustrates a rear perspective view of a pallet jack shown in FIG. 31.
Figure 33:
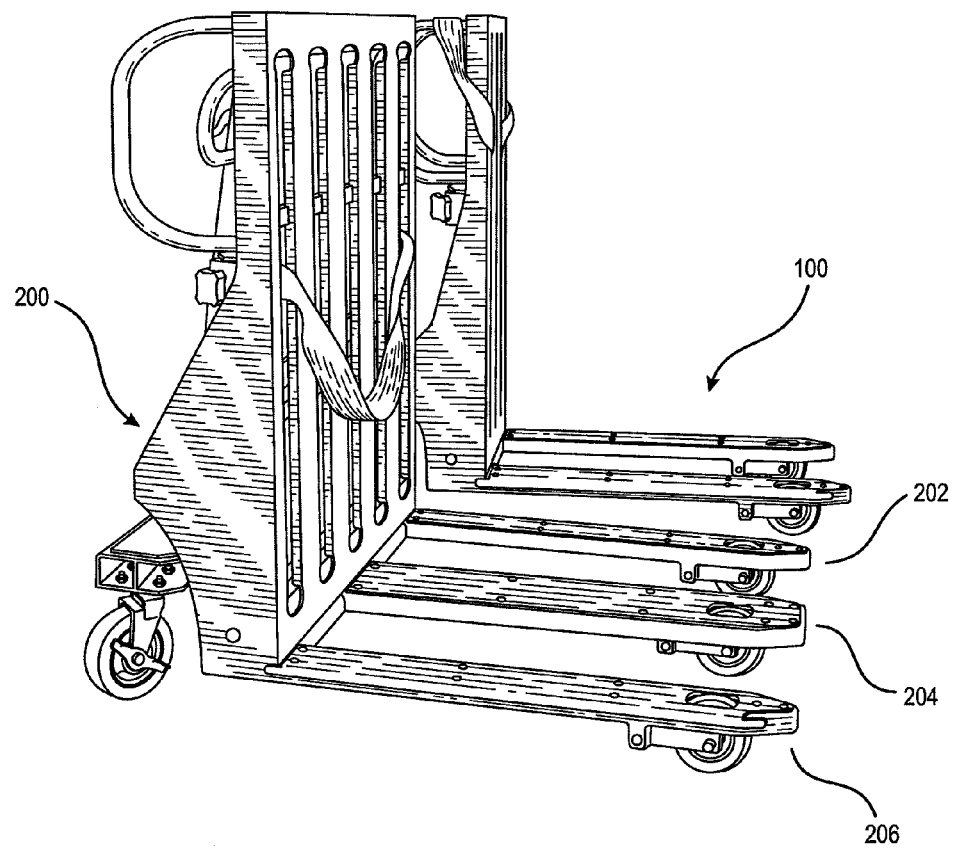
FIG. 33 illustrates a rear perspective view of the pallet jack shown in FIG. 3 and the pallet jack shown in FIG. 31 according to an embodiment of the present invention.

Referring now to FIGS. 31-34, pallet jack 200 includes left tine 202, center tine 204, and right tine 206. Left and right tines 202, 206, are preferably substantially similar in dimensions and shape. Center tine 204 is substantially similar in length to left and right tines 202, 206, but is preferably wider. Tines 202, 204, and 206 each have substantially similar wheels 208, 210, 212. Wheels 208, 210, and 212 are of substantially similar dimensions, and each can be locked in an extended, raised position (i.e., when carrying pallets), or left in a lowered or un-extended position, when no pallets are being carried (such as shown in FIGS. 31-33). According to a preferred embodiment of the present invention, center tine 204 is approximately twice as wide as either left tine 202, or right tine 206.

The configuration of left, right and center tines 202, 204, 206 enable an operator to pick up and carry two pallets at a time instead of one. Because center tine 204 is preferably twice as wide as left and right tines 202, 206, two pallets 62a, 62b, side by side, can be located on tines 202, 204, and 206 of pallet jack 200. FIG. 34 illustrates a front cross sectional view of two pallets loaded on pallet jack 200, and illustrates how the width of center tine 204 allows two pallets to be simultaneously loaded and carried at once. As shown in FIG. 34, left side 224a of left pallet 62a rests upon left tine 202, and right side 226a of left pallet 62a rests upon left side 205a of center tine 204. Left side 224b of right pallet 62b rests upon right side 205b of center tine 204, and right side 226b of right pallet 62b rests upon right tine 206. Picking up and carrying two pallets increases efficiency in all phases of product storage and delivery operations, including increasing the efficiency in warehouse operations, increasing the efficiency in loading and unloading of trucks, and increasing the efficiency in putting product for sale into stores.

According to an alternate exemplary embodiment of the present invention, pallet jack 200, and pallet jack 300 can further comprise two center wheels 230a, 230b (not shown, but located directly under handle 228 show in FIG. 32). In this alternate exemplary configuration, left and right rear wheels 216, 218 remain substantially similar dimensionally, but are smaller in diameter than center wheels 230a, 230b, so that wheels 216 and 218 effectively operate as "training wheels" for pallet jack 200. Use of center wheels 230a, 230b in conjunction with handle 228 and outer wheels 216, 218 provides increased maneuverability and sufficiently stable operation, should tipping occur. Outer wheels 216, 218, with a reduced diameter, allow pallet jack 200 to be maneuvered in warehouse, parking lot and store environments, and avoid small obstacles on the floors of the respective locations. The combination of center wheels and outer wheels substantially maximizes maneuverability yet minimizes the possibility of tipping. If outer wheels 216, 218 were too small, pallet jack 200 could tip over if left and right pallets 62a, b were too top heavy, or if pallet jack 200 was maneuvered abruptly.

Figure 35:
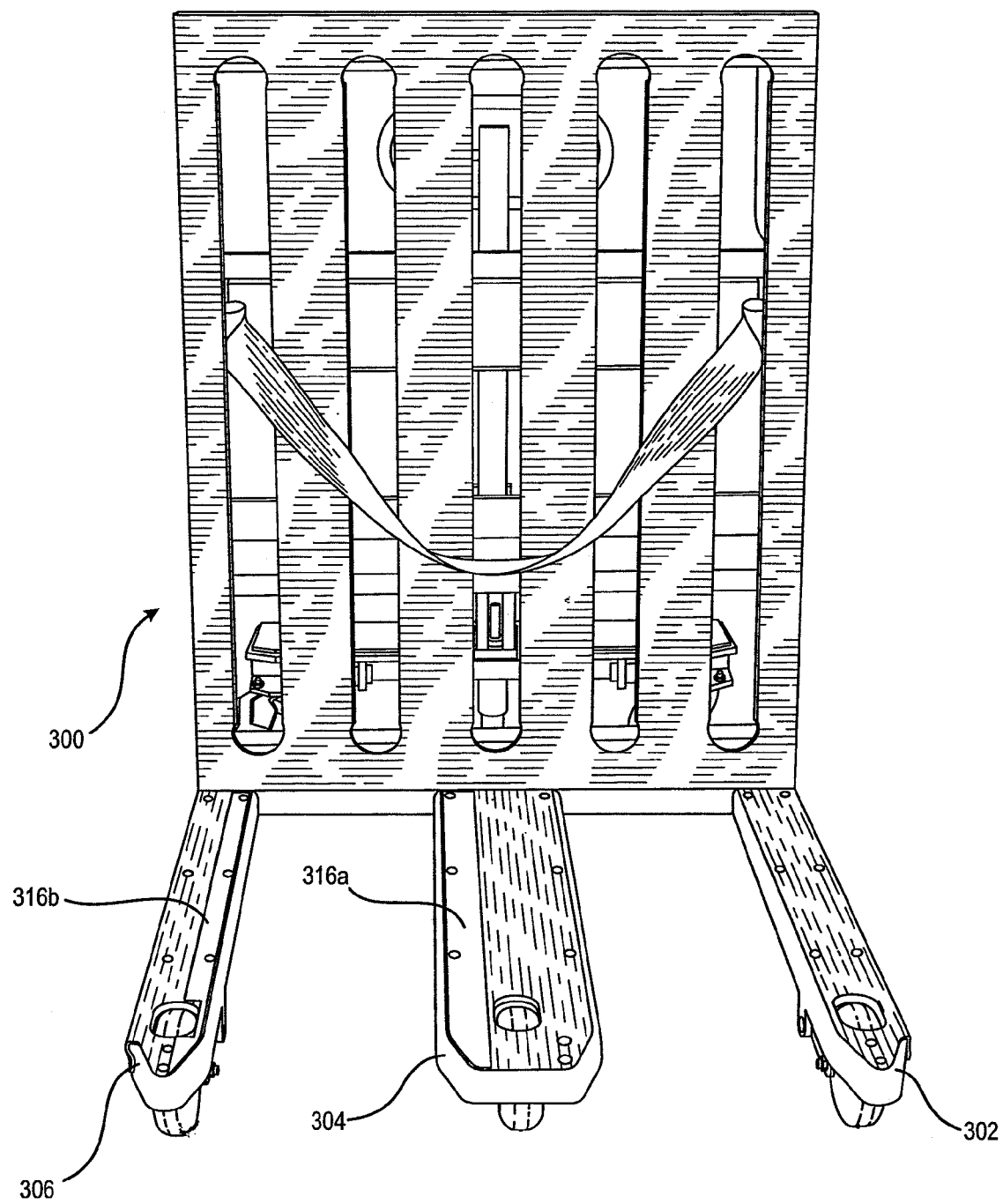
FIG. 35 illustrates a front perspective view of a pallet jack according to an alternate embodiment of the present invention.

Referring now to FIGS. 35-37, raised areas 316a and 316b are shown on center tine 304 and right tine 306, respectively, on pallet jack 300. According to a preferred embodiment of the present invention, raised areas 316a and 316b add between about 0.5 inches and about 0.75 inches to the height of center tine 304 and right tine 306, as shown in FIGS. 35-37. FIG. 36 illustrates a front view of left, center and right tines 302, 304, and 306, respectively. Left tine 302 does not have a raised area, and has a nominal height h. Center tine 304 includes raised area 316a on its right-most side, that corresponds to raised area 316b on right tine 306. The raised area comprises an additional height $\Delta h$; according to a preferred embodiment of the present invention, $\Delta h$ is between about 0.5 inches and 0.75 inches high. Therefore, the total height of the right-most side of center tine 304 and right tine 306 is $h+\Delta h$. As shown in FIG. 37, adding raised areas 316a, 316b to center tine 204 and right tine 306 enables an operator of pallet jack 300 to not only raise, lift, carry and place two pallets 62a, 62b at a time, side by side, with a minimization of space, but it also allows the operator to more efficiently and easily place a left pallet 62a down in a different location than right pallet 62b. Because of raised areas 316a, 316b, the feet of right pallet 62b will be higher off the ground than left pallet 62a. The difference in height between the bottom of the feet of right pallet 62b and the feet of left pallet 62a is about $\Delta h$. Therefore, an operator can place left pallet 62a in a first location by lowering tines 302, 304, and 306 just enough to put the feet of left pallet 62a on the ground; however, as long as the operator does not lower left, center, and right tines 302, 304, and 306 more than $\Delta h$ than necessary to place left pallet 62a on the ground, right pallet 62b will stay on center and right tines 304, 306, respectively. As those of ordinary skill in the art of the present invention can appreciate, such control of tines 302, 304, and 306 is not uncommon, considering the construction and operation of modern hydraulics, and the training of operators of pallet jack 300.

As can be appreciated by those of ordinary skill in the art of the present invention, the raised areas 316a, 316b discussed above need not be disposed on center and right tines of pallet jack 300; the raised areas can be disposed on the left tine and the center tine, in a manner substantially similar to that as described above, such that left pallet 62a is higher than right pallet 62b. Also, raised area 316b, on right tine 306, can cover substantially the entire width of right tine 306, or, a partial width (as shown in FIG. 35). The same applies if a raised area were to be added to left tine 302.

Therefore, new alternate embodiments of a pallet jack have been described (pallet jack 200, and pallet jack 300): two pallets can be picked up and transported simultaneously with a less expensive pallet jack because only three tines are needed to lift the pallets. Only three tines are necessary because of the novel feature of a center tine that, according to a preferred embodiment of the present invention, is about two times as wide as the left and right tines of pallet jack 100. Further still, once in the process of being transported, the operator of pallet jack 300 can place left pallet 62a in a location different than right pallet 62b. If all of left, center and right tines 302, 304, 306 were of the same height h, then it would not be possible to place left pallet 62a in a location different than right pallet 62b, without significant manipulation and maneuvering, and subsequent wasting of time and money. In addition, in the process of placing left pallet 62a in a first location, without placing right pallet 62b in the same location, the tines do not have to be lowered all the way to the ground, nor even as low as to release right pallet 62b, thereby saving time, and improving efficiency.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments is are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A pallet jack, comprising:
    a left tine, a center tine, and a right tine, each having a substantially similar length and a longitudinal axis, wherein the left, center, and right tines are substantially parallel with respect to each other, and wherein the center tine has a width that is about two times as wide as a corresponding width of each of the left tine and right tine, such that the pallet jack is configured to lift a first pallet and a second pallet in a side-by-side configuration on the left tine, center tine, and right tine, wherein the left pallet rests upon the left tine and a left portion of the center tine, and the right pallet rests upon the right tine and a right portion of the center tine;
    said center tine being monolithic and, in cross-section orthogonal to its longitudinal axis, having a low portion and a high portion, which is higher than said low portion, the low portion and the high portion of the center tine being connected in cross-section orthogonal to the longitudinal axis of the center tine, said left tine, in cross-section orthogonal to its longitudinal axis having a height substantially equal to said center tine low portion, said right tine, in cross-section orthogonal to its longitudinal axis, having a height substantially equal to said center tine high portion;
    a lifting mechanism configured to lift the left, center, and right tines; and
    a pallet jack body attached to a rear-most portion of each of the left, center, and right tines.

2. The pallet jack according to claim 1, wherein the lifting mechanism operates pneumatically.

3. The pallet jack according to claim 1, wherein the lifting mechanism operates electrically.

4. The pallet jack according to claim 1, wherein the lifting mechanism operates hydraulically.

5. The pallet jack according to claim 1, further comprising:
    a substantially vertical portion; and
    a strap attached to the substantially vertical portion, wherein the strap is configured to substantially securely retain each of the first pallet and the second pallet placed on the left, center, and right tines.

6. The pallet jack according to claim 1, wherein the left, center, and right tines have respective bottom surfaces which are substantially co-planar.

7. A pallet jack, comprising:
    a left tine, a center tine, and a right tine, each having a substantially similar length and a longitudinal axis, wherein the left, center, and right tines (i) have respective bottom surfaces which are substantially co-planar and (ii) are substantially parallel to each other, and wherein, in cross-section orthogonal to its respective longitudinal axis: (i) the center tine includes a raised area and a lower area which has a different height than the raised area, the raised area and the lower area of the center tine being connected in cross-section orthogonal to the longitudinal axis of the center tine, (ii) the left tine includes a lower area having substantially the same height as the center tine lower area, and (iii) the right tine includes a raised area having substantially the same height as the center tine raised area, such that the pallet jack is configured to lift a first pallet and a second pallet in a side-by-side configuration on the left tine, center tine, and right tine, wherein the first pallet rests upon the left tine lower area and the center tine lower area, and the second pallet rests upon the right tine raised area and the center tine raised area, such that the second pallet is carried at a different height with respect to the first pallet;
    a lifting mechanism configured to lift the left tine, center tine, and right tine; and
    a pallet jack body attached to a rear-most portion of each of the left, center, and right tines.

8. The pallet jack according to claim 7, wherein a width of the center tine raised area is about one-half of a width of the center tine.

9. The pallet jack according to claim 7, wherein the heights of the center tine raised area and the right tine raised area are substantially equal to each other, and are between about 0.5 inches and about 0.75 inches.

10. The pallet jack according to claim 9, wherein the center tine raised area is between about 0.5 inches and about 0.75 inches higher than the center tine lower area.

11. The pallet jack according to claim 7, wherein the lifting mechanism operates pneumatically.

12. The pallet jack according to claim 7, wherein the lifting mechanism operates electrically.

13. The pallet jack according to claim 7, wherein the lifting mechanism operates hydraulically.

14. The pallet jack according to claim 7, further comprising:
    a substantially vertical portion; and
    a strap attached to the substantially vertical portion, wherein the strap is configured to substantially securely retain each of the first pallet and the second pallet placed on the left, center and right tines, and wherein at least one of the first pallet and the second pallet is configured to contain one or more beverage trays, and wherein each of the one or more trays is configured to retain one or more beverage bottles.

15. The pallet jack according to claim 7, wherein the center tine is monolithic.

* * * * *